US012684541B2

(12) United States Patent
Meylan et al.

(10) Patent No.: US 12,684,541 B2
(45) Date of Patent: *Jul. 14, 2026

(54) DELAYED GRANT FOR WIRELESS COMMUNICATION

(71) Applicant: QUALCOMM Incorporated, San Diego, CA (US)

(72) Inventors: Arnaud Meylan, San Diego, CA (US); Arvind Vardarajan Santhanam, San Diego, CA (US); Sunil Kandukuri, San Diego, CA (US); Ashok Mantravadi, San Diego, CA (US); Tingfang Ji, San Diego, CA (US); Gavin Bernard Horn, La Jolla, CA (US); Peter Gaal, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/167,642

(22) Filed: Feb. 10, 2023

(65) Prior Publication Data

US 2023/0269710 A1     Aug. 24, 2023

Related U.S. Application Data

(63) Continuation of application No. 17/073,882, filed on Oct. 19, 2020, now Pat. No. 11,659,529.

(Continued)

(51) Int. Cl.
| | |
|---|---|
| *H04W 72/0446* | (2023.01) |
| *H04W 72/21* | (2023.01) |
| *H04W 72/23* | (2023.01) |

(52) U.S. Cl.
CPC ....... *H04W 72/0446* (2013.01); *H04W 72/21* (2023.01); *H04W 72/23* (2023.01)

(58) Field of Classification Search
CPC .. H04W 72/0446; H04W 72/21; H04W 72/23
See application file for complete search history.

(56) References Cited

U.S. PATENT DOCUMENTS

2011/0317653 A1* 12/2011 Kwon ................... H04L 1/1887
                                                              370/329
2013/0242726 A1*  9/2013 Zhu ....................... H04L 65/752
                                                              370/329

(Continued)

FOREIGN PATENT DOCUMENTS

HU      E039456  T2     1/2019
WO   2018202120  A1    11/2018

OTHER PUBLICATIONS

International Search Report and Written Opinion—PCT/US2020/056513—ISA/EPO—Dec. 18, 2020.

(Continued)

*Primary Examiner* — Jasper Kwoh
(74) *Attorney, Agent, or Firm* — Holland & Hart LLP

(57) ABSTRACT

Methods, systems, and devices for wireless communications are described. A user equipment (UE) may transmit a grant delay request to a base station. The grant delay request may indicate a future time, at or thereafter a base station is requested to allocate resources to the UE. The base station may transmit the uplink grant to the UE allocating the resources to the UE based on the grant delay request, and the UE may transmit, to the base station, an uplink transmission including the uplink data based on the uplink grant. The UE may transmit the grant delay request as part of a scheduling request (SR), or as part of a buffer status report (BSR), or a combination of these.

26 Claims, 17 Drawing Sheets

Related U.S. Application Data

(60) Provisional application No. 62/924,570, filed on Oct. 22, 2019.

(56)                    References Cited

U.S. PATENT DOCUMENTS

| | | | |
|---|---|---|---|
| 2014/0177449 A1* | 6/2014 | Novak | H04W 4/80 |
| | | | 370/329 |
| 2016/0128096 A1* | 5/2016 | Damnjanovic | H04L 1/1861 |
| | | | 370/329 |
| 2016/0142934 A1* | 5/2016 | Ahmadzadeh | H04W 28/06 |
| | | | 370/328 |
| 2018/0020431 A1 | 1/2018 | Cho et al. | |
| 2018/0146410 A1 | 5/2018 | Cho et al. | |
| 2018/0227941 A1* | 8/2018 | Zhang | H04W 72/21 |
| 2019/0014606 A1 | 1/2019 | Li et al. | |
| 2019/0098644 A1 | 3/2019 | Loehr et al. | |
| 2019/0342902 A1 | 11/2019 | Wu et al. | |
| 2019/0349145 A1* | 11/2019 | You | H04W 16/14 |
| 2020/0068651 A1* | 2/2020 | Xu | H04W 72/21 |
| 2020/0196327 A1 | 6/2020 | Zhang et al. | |
| 2020/0205028 A1 | 6/2020 | Kim et al. | |
| 2020/0281000 A1 | 9/2020 | Loehr et al. | |
| 2020/0351704 A1 | 11/2020 | Yu et al. | |
| 2021/0120551 A1 | 4/2021 | Meylan et al. | |

OTHER PUBLICATIONS

International Preliminary Report on Patentability—PCT/US2020/056513 The International Bureau of WIPO—Geneva, Switzerland, May 5, 2022.

* cited by examiner

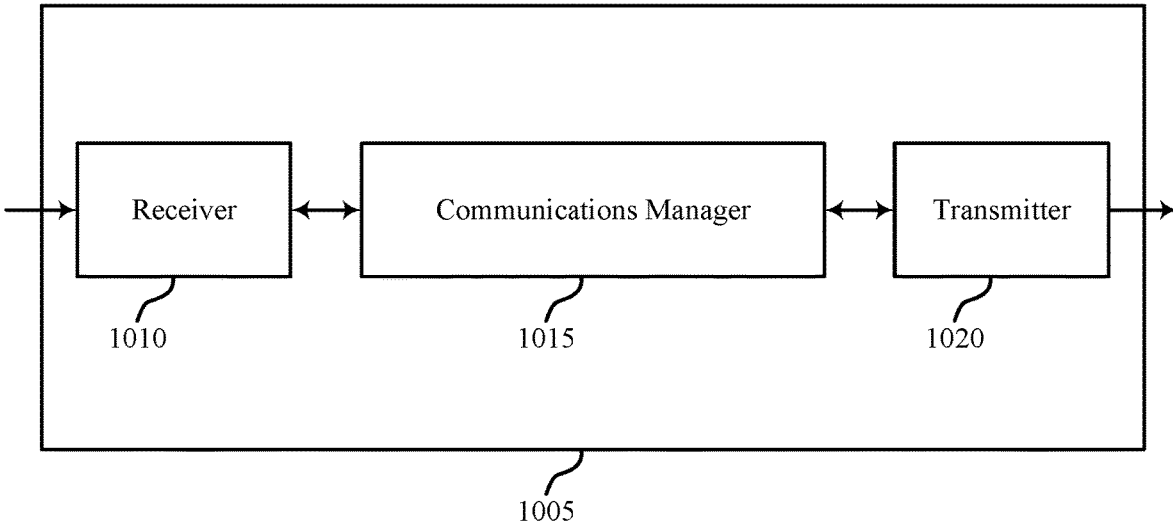
1010               1015               1020
1005
1000
FIG. 10

Transmit a grant delay request that
indicates a future time, at or after which a
base station is requested to allocate
resources to the UE

1405

Receive an uplink grant from the base
station allocating the resources to the UE
based on the grant delay request

1410

Transmit, to the base station, an uplink
transmission including uplink data based
on the uplink grant

1415

1400

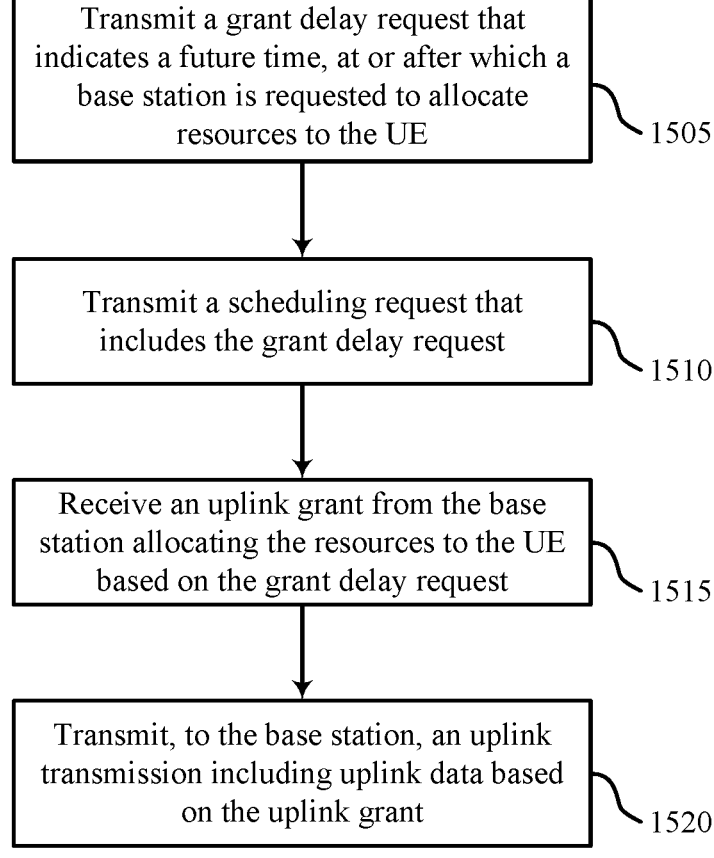

Transmit a grant delay request that
indicates a future time, at or after which a
base station is requested to allocate
resources to the UE ⟩ 1505

Transmit a scheduling request that
includes the grant delay request ⟩ 1510

Receive an uplink grant from the base
station allocating the resources to the UE
based on the grant delay request ⟩ 1515

Transmit, to the base station, an uplink
transmission including uplink data based
on the uplink grant ⟩ 1520

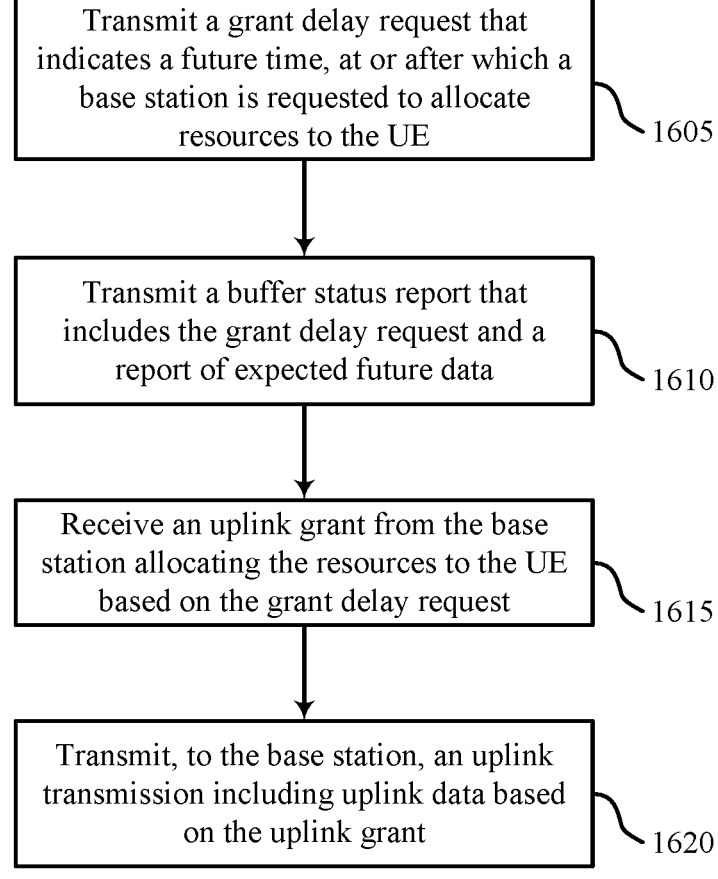

Transmit a grant delay request that indicates a future time, at or after which a base station is requested to allocate resources to the UE

1605

Transmit a buffer status report that includes the grant delay request and a report of expected future data

1610

Receive an uplink grant from the base station allocating the resources to the UE based on the grant delay request

1615

Transmit, to the base station, an uplink transmission including uplink data based on the uplink grant

Receive, from a UE, a grant delay request that indicates a future time, at or after which the base station is requested to allocate resources to the UE

1705

Transmit an uplink grant to the UE allocating the resources to the UE based on the grant delay request

1710

1700

DELAYED GRANT FOR WIRELESS COMMUNICATION

CROSS REFERENCE

The present Application for Patent is a continuation of U.S. Non-provisional Ser. No. 17/073,882 by MEYLAN et al., entitled "DELAYED GRANT FOR WIRELESS COMMUNICATION," filed Oct. 19, 2020, which claims the benefit of U.S. Provisional Patent Application No. 62/924,570 by MEYLAN et al., entitled "DELAYED GRANT FOR WIRELESS COMMUNICATION," filed Oct. 22, 2019, assigned to the assignee hereof, and expressly incorporated by reference herein.

FIELD OF TECHNOLOGY

The following relates generally to wireless communications and more specifically to delayed grant for wireless communication.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE and a modem may be connected to a host, and the UE and modem may receive data transmissions from a base station. The UE and modem may transmit a response to the base station in designated resources based on a scheduling request (SR) transmitted to the base station. Significant latency may incur based on the delay between when the UE and modem have a response to transmit to the base station, and when the response is transmitted in allocated resources due to processing delays.

SUMMARY

The described techniques relate to improved methods, systems, devices, and apparatuses that support delayed grant for wireless communication. Generally, the described techniques provide for a user equipment (UE) to transmit a grant delay request to a base station. The grant delay request may indicate a future time for the base station to provide an uplink grant of resources to the UE. The base station may transmit, to the UE, the uplink grant immediately, or responsive to receiving the grant delay request, to allocate the resources at the indicated future time or a time after the future time based on the grant delay request. In some cases, the base station may transmit the uplink grant in a control channel that immediately precedes or is used to schedule a corresponding shared data channel in which the resources are allocated. The UE may transmit, to the base station, an uplink transmission including uplink data, such as an acknowledgment (ACK) message, within the resources allocated to the UE by the uplink grant. In some examples, the UE may receive the grant when the UE predicts it will have uplink data available for transmission. Using the techniques described herein, the UE beneficially may reduce latency between uplink data is available for transmission and when the UE is able to transmit an uplink transmission.

A method of wireless communications by a UE is described. The method may include transmitting a grant delay request that indicates a future time, at or after which a base station is requested to allocate resources to the UE, receiving an uplink grant from the base station allocating the resources to the UE based on the grant delay request, and transmitting, to the base station, an uplink transmission including uplink data based on the uplink grant.

An apparatus for wireless communications by a UE is described. The apparatus may include a processor, memory coupled with the processor, and instructions stored in the memory. The instructions may be executable by the processor to cause the apparatus to transmit a grant delay request that indicates a future time, at or after which a base station is requested to allocate resources to the UE, receive an uplink grant from the base station allocating the resources to the UE based on the grant delay request, and transmit, to the base station, an uplink transmission including uplink data based on the uplink grant.

Another apparatus for wireless communications by a UE is described. The apparatus may include means for transmitting a grant delay request that indicates a future time, at or after which a base station is requested to allocate resources to the UE, receiving an uplink grant from the base station allocating the resources to the UE based on the grant delay request, and transmitting, to the base station, an uplink transmission including uplink data based on the uplink grant.

A non-transitory computer-readable medium storing code for wireless communications by a UE is described. The code may include instructions executable by a processor to transmit a grant delay request that indicates a future time, at or after which a base station is requested to allocate resources to the UE, receive an uplink grant from the base station allocating the resources to the UE based on the grant delay request, and transmit, to the base station, an uplink transmission including uplink data based on the uplink grant.

In some examples of the method, apparatuses, and non-transitory computer-readable medium described herein, transmitting the grant delay request may include operations, features, means, or instructions for transmitting the grant delay request that indicates a requested resource allocation size, where the uplink grant indicates a resource allocation size that may be selected based on the requested resource allocation size.

In some examples of the method, apparatuses, and non-transitory computer-readable medium described herein, transmitting the grant delay request may include operations, features, means, or instructions for transmitting a SR that includes the grant delay request.

In some examples of the method, apparatuses, and non-transitory computer-readable medium described herein, transmitting the SR may include operations, features, means, or instructions for transmitting the SR during a next occurrence of a SR occasion.

In some examples of the method, apparatuses, and non-transitory computer-readable medium described herein, the future time may be a defined number of slots after a slot in which the SR may be transmitted.

In some examples of the method, apparatuses, and non-transitory computer-readable medium described herein, transmitting the grant delay request may include operations, features, means, or instructions for transmitting a buffer status report (BSR) that includes the grant delay request and a report of expected future data.

In some examples of the method, apparatuses, and non-transitory computer-readable medium described herein, transmitting the BSR may include operations, features, means, or instructions for transmitting the BSR that includes a requested resource allocation size, where the uplink grant indicates a resource allocation size that may be selected based on the requested resource allocation size.

In some examples of the method, apparatuses, and non-transitory computer-readable medium described herein, the future time may be a defined number of slots after a slot in which the BSR may be transmitted.

Some examples of the method, apparatuses, and non-transitory computer-readable medium described herein may further include operations, features, means, or instructions for receiving a BSR configuration for requesting a delayed resource allocation, where the BSR may be transmitted based on the BSR configuration.

In some examples of the method, apparatuses, and non-transitory computer-readable medium described herein, the future time may be indicated using a reference time. In some examples of the method, apparatuses, and non-transitory computer-readable medium described herein, the reference time may correspond to a superframe number and a sub-frame number, or a frame number and a slot number.

In some examples of the method, apparatuses, and non-transitory computer-readable medium described herein, transmitting the grant delay request may include operations, features, means, or instructions for transmitting the grant delay request before the uplink data may be available for transmission.

In some examples of the method, apparatuses, and non-transitory computer-readable medium described herein, transmitting the grant delay request may include operations, features, means, or instructions for transmitting the grant delay request that includes a first scheduling request (SR) signature from a set of SR signatures, where each of the set of SR signatures corresponds to a different amount of time requested for the base station to delay providing the uplink grant.

In some examples of the method, apparatuses, and non-transitory computer-readable medium described herein, the first SR signature may be selected before the uplink data may be available for transmission.

Some examples of the method, apparatuses, and non-transitory computer-readable medium described herein may further include operations, features, means, or instructions for receiving a SR signature configuration that indicates the set of SR signatures and a respective grant delay corresponding to each of the set of SR signatures.

In some examples of the method, apparatuses, and non-transitory computer-readable medium described herein, receiving the SR signature configuration may include operations, features, means, or instructions for receiving control signaling that indicates the SR signature configuration.

In some examples of the method, apparatuses, and non-transitory computer-readable medium described herein, each of the set of SR signatures may be a different bit sequence of a set of bit sequences.

In some examples of the method, apparatuses, and non-transitory computer-readable medium described herein, transmitting the uplink transmission may include operations, features, means, or instructions for transmitting the uplink transmission in a shared data channel based on the uplink grant.

A method of wireless communications by a base station is described. The method may include receiving, from a UE, a grant delay request that indicates a future time, at or after which the base station is requested to allocate resources to the UE and transmitting an uplink grant to the UE allocating the resources to the UE based on the grant delay request.

An apparatus for wireless communications by a base station is described. The apparatus may include a processor, memory coupled with the processor, and instructions stored in the memory. The instructions may be executable by the processor to cause the apparatus to receive, from a UE, a grant delay request that indicates a future time, at or after which the base station is requested to allocate resources to the UE and transmit an uplink grant to the UE allocating the resources to the UE based on the grant delay request.

Another apparatus for wireless communications by a base station is described. The apparatus may include means for receiving, from a UE, a grant delay request that indicates a future time, at or after which the base station is requested to allocate resources to the UE and transmitting an uplink grant to the UE allocating the resources to the UE based on the grant delay request.

A non-transitory computer-readable medium storing code for wireless communications by a base station is described. The code may include instructions executable by a processor to receive, from a UE, a grant delay request that indicates a future time, at or after which the base station is requested to allocate resources to the UE and transmit an uplink grant to the UE allocating the resources to the UE based on the grant delay request.

In some examples of the method, apparatuses, and non-transitory computer-readable medium described herein, the uplink grant indicates a grant of resource s corresponding to the future time indicated in the grant delay request.

Some examples of the method, apparatuses, and non-transitory computer-readable medium described herein may further include operations, features, means, or instructions for receiving, from the UE, an uplink transmission including uplink data in a shared data channel based on the uplink grant.

In some examples of the method, apparatuses, and non-transitory computer-readable medium described herein, the future time may be indicated using a reference time. In some examples of the method, apparatuses, and non-transitory computer-readable medium described herein, the reference time may correspond to a superframe number and a sub-frame number, or a frame number and a slot number.

In some examples of the method, apparatuses, and non-transitory computer-readable medium described herein, receiving the grant delay request may include operations, features, means, or instructions for receiving the grant delay request that indicates a requested resource allocation size, where the uplink grant indicates a resource allocation size that may be selected based on the requested resource allocation size.

In some examples of the method, apparatuses, and non-transitory computer-readable medium described herein, receiving the grant delay request may include operations, features, means, or instructions for receiving a SR that includes the grant delay request; or, and receiving a BSR that includes the grant delay request and a report of expected future data.

In some examples of the method, apparatuses, and non-transitory computer-readable medium described herein, receiving the grant delay request may include operations, features, means, or instructions for receiving the grant delay request before the uplink data may be available for transmission.

In some examples of the method, apparatuses, and non-transitory computer-readable medium described herein, receiving the grant delay request may include operations, features, means, or instructions for receiving the grant delay request that includes a first SR signature from a set of SR signatures, where each of the set of SR signatures corresponds to a different amount of time requested for the base station to delay providing the uplink grant.

In some examples of the method, apparatuses, and non-transitory computer-readable medium described herein, the first SR signature may be selected before the uplink data may be available for transmission.

Some examples of the method, apparatuses, and non-transitory computer-readable medium described herein may further include operations, features, means, or instructions for transmitting a SR signature configuration that indicates the set of SR signatures and a respective delay corresponding to each of the set of SR signatures.

In some examples of the method, apparatuses, and non-transitory computer-readable medium described herein, transmitting the SR signature configuration may include operations, features, means, or instructions for receiving control signaling that indicates the SR signature configuration.

BRIEF DESCRIPTION OF THE DRAWINGS

FIGS. 10 and 11 show block diagrams of devices that support delayed grant for wireless communication in accordance with aspects of the present disclosure.

FIGS. 14 through 17 show flowcharts illustrating methods that support delayed grant for wireless communication in accordance with aspects of the present disclosure.

DETAILED DESCRIPTION

Figure 1:
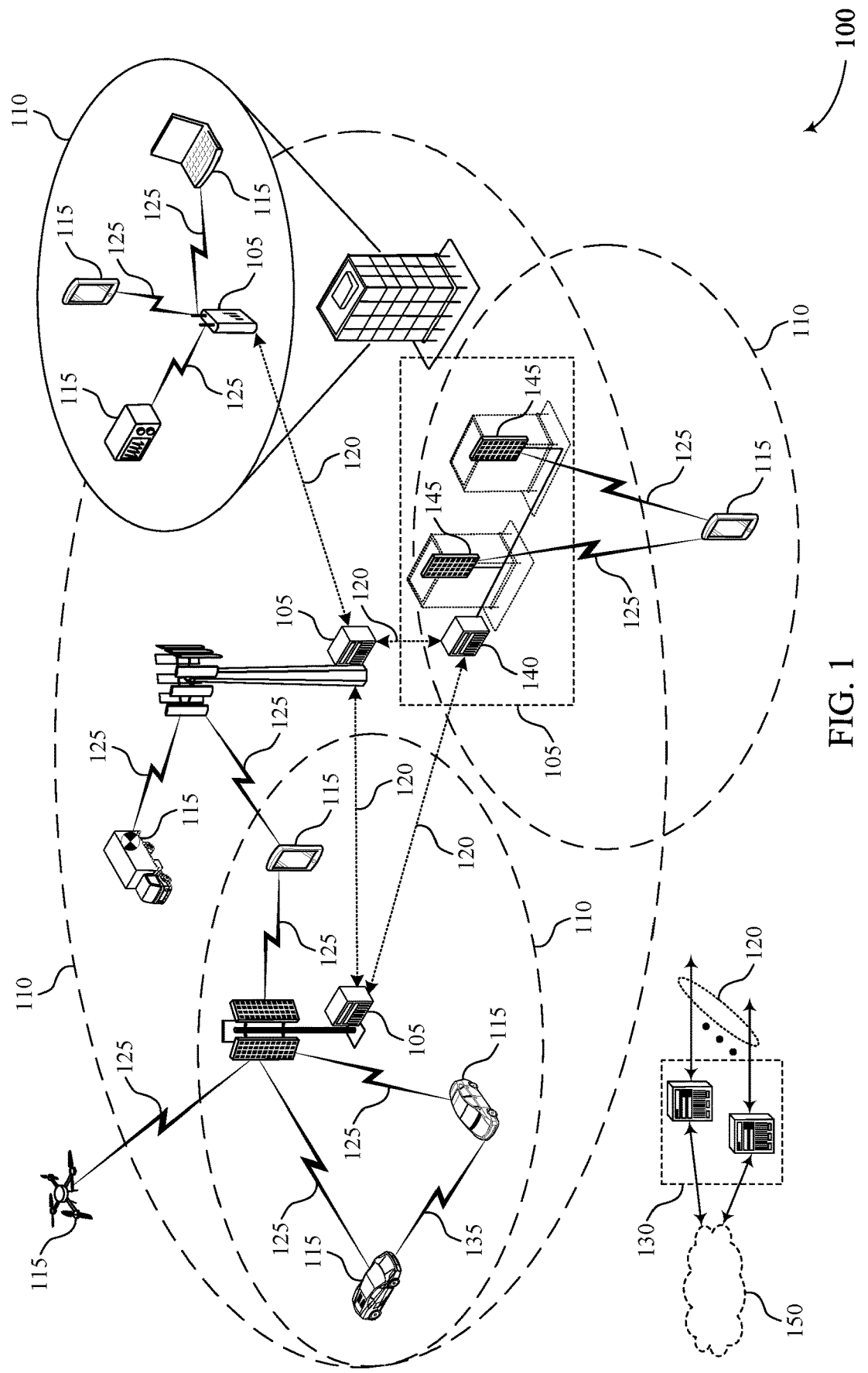
FIG. 1 illustrates an example of a wireless communications system that supports delayed grant for wireless communication in accordance with aspects of the present disclosure.

A user equipment (UE) may be connected to a host device in a wireless communication network. The UE may also include or be connected to a modem, and the UE and modem pair may communicate with a base station. The UE and modem pair may relay messages from a base station or other wireless device to the host device. For example, a base station may transmit data, such as transmission control protocol (TCP) data in a physical downlink shared channel (PDSCH) to the modem of the UE. The modem may transmit the received TCP data to the host device. The host device may process the data, and transmit an acknowledgment (ACK) or negative acknowledgment (NACK) to the modem of the UE indicating that whether TCP data is received and decoded correctly. The TCP ACK that the host device transmits to the UE and modem, and that the UE and modem transmit to the base station may be an example of causal machine response traffic.

Based on receiving an ACK from the host, the UE, via its modem, may transmit a scheduling request (SR) in a physical uplink shared channel (PUCCH) to the base station, in order to request uplink resources for the transmission of the ACK to the base station. In these cases, the UE may then wait for a grant from the base station indicating resource for the transmission of the ACK from the UE, and the UE may then transmit the ACK or other data received from the host to the base station.

However, in many cases, the transmission of the data from the UE to the host and the ACK/NACK response from the UE to the base station may be a part of communications that are associated with high reliability or low latency communications. Thus, the delay between reception of the ACK at the UE from the host and the transmission of the ACK by the UE to the base station may be undesirable and lead to excessive latency. The delay may be caused by processing delays at the host, the UE, and the base station, as well as delays at the UE in waiting for an SR occasion on which to transmit the request for resources for the ACK, the delay in waiting for the grant of uplink resources from the base station, and the delay until the UE may transmit on the granted resources.

In order to decrease the amount of delay in the system, the UE may utilize a predictive SR technique to lower latency. Based on prior communications, the UE may be able to predict when the UE may have uplink data available to transmit, and how much uplink data is available to transmit. This prediction may be based on transmissions between the UE, modem, and the host, and may be determined based on prior patterns of transmission from the host to the UE and from the UE to the base station. This may be applicable in cases of TCP communications, other machine-type communications, and other wireless communications. The predictive SR may include the UE transmitting an SR prior to receiving the ACK from the host. The SR transmitted by the UE may include a future time at which the UE desires to receive a grant from the base station, such that the grant from the base station may be received at a point when the UE has predictably received the ACK or other data from the host that is ready for uplink transmission by the modem of the UE to the base station.

Additionally, the UE may provide an indication of the requested grant delay by transmitting a future buffer status report (FBSR) to the base station as part of medium access control (MAC) layer communications. The UE may transmit the FBSR with the indication of the requested grant delay in cases where SR bits are limited. The UE may transmit the FBSR based on transmitted an SR for an uplink grant from the base station for the transmission of the FBSR.

The UE and modem may use predictive SR and the FBSR for the scheduling and transmission of other data apart from TCP ACK, as well as for other types of causal machine response traffic (e.g., user datagram protocol (UDP) traffic, internet control message protocol (ICMP) traffic, non-IP traffic).

Aspects of the disclosure are initially described in the context of wireless communications systems. Aspects of the disclosure are then described in the context of process flows. Aspects of the disclosure are further illustrated by and described with reference to apparatus diagrams, system diagrams, and flowcharts that relate to delayed grant for wireless communication.

FIG. 1 illustrates an example of a wireless communications system 100 that supports delayed grant for wireless communication in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples, the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In order to decrease the amount of delay in the system, the UE 115 may utilize a predictive SR technique to lower latency. Based on prior communications, the UE 115 may be able to predict when the UE 115 may have uplink data available to transmit, and how much uplink data is available to transmit. This prediction may be based on transmissions between the UE 115, a modem of the UE 115, and a host that is internal or external to the UE 115, and may be determined based on prior patterns of transmission from the host to the UE 115 and from the UE 115 to the base station 105. This may be applicable in cases of TCP communications, other machine-type communications, and other wireless communications. The predictive SR technique may include the UE 115 transmitting an SR prior to receiving the ACK from the host. The SR transmitted by the UE 115 may include a future time at which the UE 115 desires to receive a grant from the base station 105, such that the grant from the base station may be received at a point when the UE has predictably received the ACK or other data from the host that is ready for uplink transmission by the modem of the UE 115 to the base station 105.

Figure 2:
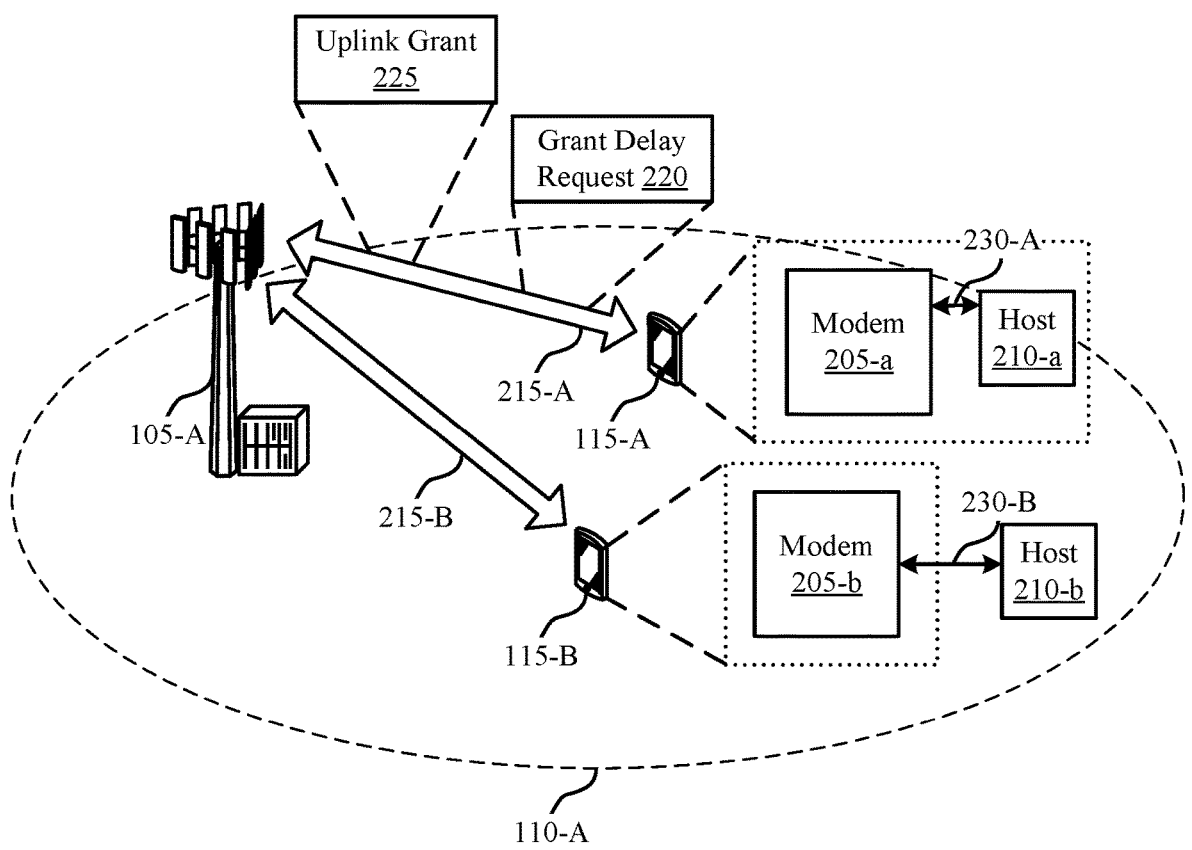
FIG. 2 illustrates an example of a wireless communications system that supports delayed grant for wireless communication in accordance with aspects of the present disclosure.

FIG. 2 illustrates an example of a wireless communications system 200 that supports delayed grant for wireless communication in accordance with aspects of the present disclosure. In some examples, wireless communications system 200 may implement aspects of wireless communication system 100. UEs 115-a and 115-b may communicate with base station 105-a over communications links 215-a and 215-b, respectively. UEs 115 may communicate for modems 205 and hosts 210 in various configuration. In one example configuration, UE 115-a may include a modem 205-a and a host 210-a. Modem 205-a and host 210-a may be connected via a connection link 230-a. In another example configuration, UE 115-b may include modem 205-b which may be connected to an external host 210-b via connection link 230-b. UEs 115-a and 115-b may include other components not indicated in wireless communication system 200 and described elsewhere herein.

UE 115-a and modem 205-a may receive TCP data or other data from base station 105-a in a PDSCH over communication link 215-a. UE 115-a and modem 205-a may relay the TCP data to host 210-a over connection link 230-a. Host 210-a may process the data, and may transmit an ACK to the modem 205-a and UE 115-a.

Base station 105-a may configure UE 115-a with a set of one or more SR occasions that may occur periodically, semi-statically, or aperiodically. UE 115-a may transmit a SR in a particular SR occasion (e.g., next occurring SR occasion) when UE 115-a has uplink data to transmit to base station 105-a. UE 115-a may transmit an SR to request a downlink grant from base station 105-a allocating resources for an uplink transmission from UE 115-a.

In some cases, UE 115-a may receive an ACK or other uplink data from host 210-a, and may wait for a SR occasion on which to transmit an SR to base station 105-a. In these cases, UE 115-a may transmit the SR to base station 105-a, and base station 105-a may process the SR, and respond to the SR by transmitting an uplink grant 225 to UE 115-a indicating future uplink resources that UE 115-a may use for an uplink transmission. UE 115-a may then transmit uplink data, such as the ACK or other data received from host 210-a, via the uplink resources to base station 105-a. In some cases, there may be an extensive delay between the time that UE 115-a receives the ACK from host 210-a and the time that UE 115-a transmits the uplink data (e.g., the ACK) to base station 105-a.

In order to decrease the latency and improve efficiency, UE 115-a may indicate a future time when an uplink grant is requested. In this case, the UE 115-a may transmit a grant delay request 220 as part of an SR to base station 105-a. The grant delay request 220 and SR may be transmitted by UE 115-a to base station 105-a before UE 115-a receives uplink data (e.g., an ACK) from host 210-a for uplink transmission to the base station 105-a. For example, UE 115-a may use an SR to request an uplink grant at a future time when uplink data that is predicted to arrive at UE 115-a for transmission to the base station 105-a, even before uplink data arrives at the UE 115-a and/or its modem. UE 115-a may transmit grant delay request 220 based on a predicted arrival time of the uplink data from host 210-a.

The SR transmitted by UE 115-a may indicate a future time, which may be based on a reference time indicated by the time that the SR is transmitted, and an additional time that is also indicated in the SR. For example, UE 115-a may indicate a number of time intervals, superframes, subframes, slots, or the like, that have elapsed since the reference time. The future time may be indicated as a fraction of the SR interval in cases where the SR occasion interval is periodically scheduled by base station 105-a. For example, UE 115-a may transmit an SR that indicates a future time of one-quarter of the SR interval, one-half of the SR interval, three-quarters of the SR interval, and other fractions indicating a time before the next SR occasion or a time after the next SR occasion.

The base station 105-a may receive grant delay request 220 indicating the future time at which an uplink grant is requested, and may transmit uplink grant 225 at a delayed time based on the future time indicated in the grant delay request 220. In some examples, the base station 105-a may transmit the uplink grant 225 at a time relatively close to the future time indicated by the UE 115-a that provides an allocation of resources to the UE 115-a at or after the future time indicated in the grant delay request 220. For example, base station 105-a may transmit the uplink grant 225 in a control channel (e.g., PDCCH) that is used to send control information for scheduling a data channel (e.g., a PDSCH within a same slot, frame, superframe, as the PDCCH). The allocated resources may be time and frequency resources, such as one or more resource elements, one or more resource blocks, one or more symbol periods, or the like, or any combination thereof. Thus, UE 115-a may indicate a grant delay request 220 such that the uplink grant 225 may be received from base station 105-a at a future time so that UE 115-a may be able to transmit more uplink data (e.g., ACK) to base station 105-a in a shorter amount of time after when the uplink data is received (e.g., from the host 210-a). In some cases, the UE 115-a may transmit the uplink transmission of TCP data or other data in a shared channel (e.g., a physical uplink shared channel (PUSCH)) based on the uplink grant 225 received from base station 105-a. In some examples, the uplink grant 225 may be transmitted immediately or shortly after the grant delay request 220 is received, and the grant 225 may provide an allocation of resources to the UE 115-a at or after the future time indicated in the grant delay request 220.

UE 115-a may transmit the SR to indicate a future time at which an uplink grant is desired based on a prediction of when uplink data, such as an ACK, will be received from host 210-a. In some cases, the predicted arrival time of uplink data may be based on previous communications with host 210-a. The prediction and corresponding grant delay request may also be based on the time that the TCP data is transmitted from UE 115-a to host 210-a.

Thus, UE 115-a may accommodate data arriving from host 210-a at a time after a scheduled grant time from base station 105-a. Base station 105-a may also increase the frequency of SR occasions, which may increase uplink overhead.

The functionality of the grant delay may be realized at the MAC layer. In some cases, there may be a limited number of SR bits available to UE 115-*a* for transmission of the SR, and UE 115-*a* may not be able to include a grant delay request 220 in the SR. The UE 115-*a* may still predict future data arrival of uplink data from host 210-*a*, and may transmit a SR before receiving the uplink data. In some examples, UE 115-*a* may transmit an indication of a future buffer status report (FBSR) to base station 105-*a*. The FBSR may include an indication of a grant delay request 220 that indicates a future time at which an uplink grant is requested as well as a predicted amount of data per logical channel. The base station 105-*a* may receive the FBSR, and may delay transmitting uplink grant 225 based on the future time indicated in the FBSR. UE 115-*a* may include an indication of the amount of data in an uplink transmit buffer in the FBSR, and UE 115-*a* may also indicate the future time that UE 115-*a* is requesting to receive the uplink grant 225. In some examples, the base station 105-*a* may transmit an FBSR configuration. That is, the base station 105-*a* may configure the UE 115-*a* to transmit the FBSR requesting a delayed resource allocation.

In some examples to reduce uplink transmission latency, UE 115-*a* may transmit multiple SRs (e.g., at up to each SR occasion) indicating more data than UE 115-*a* has predicted that it will have available to transmit to base station 105-*a*, and UE 115-*a* may receive uplink grants 225 for each SR. The UE 115-*a* may transmit padding or may skip some of the uplink grants 225 (e.g., when the UE 115-*a* does not have uplink data to transmit in resources allocated by a particular uplink grant 225). When uplink data is available for transmission, UE 115-*a* may use the resources indicated in an uplink grant 225 that is most recently received after uplink data becomes available for transmission in order to transmit the uplink data (e.g., ACK) to base station 105-*a* over communication link 215-*a*.

UE 115-*b* may perform similar predictive SR or FBSR techniques as UE 115-*a*. UE 115-*b* may communicate via modem 205-*b* to host 210-*b*, which may be external to UE 115-*b*. Communication with the external host 210-*b* may in some cases incur further processing delay, which may delay when UE 115-*b* receive an ACK or other uplink data from host 210-*b*. UE 115-*b* may transmit a grant delay request 220 to base station 105-*a* over communication link 215-*b* (either in a SR or in the FBSR of the MAC layer) that indicates a future time at which an uplink grant 225 is requested that accounts for the additional delay, and the base station 105-*a* may transmit uplink grant 225 to UE 115-*b* over communication link 215-*b* in a physical downlink control channel (PDCCH) in accordance with the indicated future time, so that UE 115-*b* may transmit the ACK or other uplink data from host 210-*b* shortly after the ACK or other uplink data is available for uplink transmission.

The future time may be indicated using a reference time (e.g., absolute radio reference time). The reference time may correspond to a superframe number and a subframe number (e.g., in the case of LTE operations) or a frame number and a slot number (e.g., in the case of NR operations). For example, either or both of UEs 115-*a* and 115-*b* may indicate a number of time intervals, superframes, subframes, slots, or the like, that have elapsed since the reference time. The future time may be a defined number of slots after a slot in which the FBSR or SR is transmitted.

Base station 105-*a* may configure UEs 115-*a* and 115-*b* with a set of signatures. UE 115-*a* may receive a SR configuration that indicates the set of SR signatures and a respective grant delay distinct to each SR signatures of the set of SR signatures. Each SR signature may be a different bit sequence of a set of bit sequences. Each signature may correspond to a different future time at which the UE 115 desires to receive an uplink grant from base station 105-*a* with respect to the time of the SR occasion. Each signature configured by base station 105-*a* may be associated with a delay corresponding to the requested time between transmission of the SR and the reception of the uplink grant from the base station 105. UE 115-*a* may receive control signaling that may indicate the SR signature configuration. The signatures may be configured in control signaling via RRC, indicated by MAC CE, or may be controlled by the UE 115. UE 115-*a* may, for example, select one signature of a set of configured signatures based on the time delay requested by UE 115-*a*.

UE 115-*a* may transmit grant delay request 220 including a first SR signature from a set of SR signatures, where each of the set of SR signatures may correspond to a different amount of time requested for base station 105-*a* to delay providing the uplink grant. For example, UE 115-*a* may select a particular signature of the set of signatures, based on, for example, a predicted arrival time of uplink data for transmission to base station 105-*a*. UE 115-*a* may transmit communications or SR transmissions including the signature. Distinct SR signatures may be used when there are sufficient SR resources to accommodate a set of distinct signatures. The signatures may in some cases use a defined number of bits to provide a desired number of distinct signatures to with a desired granularity of the desired delay in the requested grant.

Figure 3:
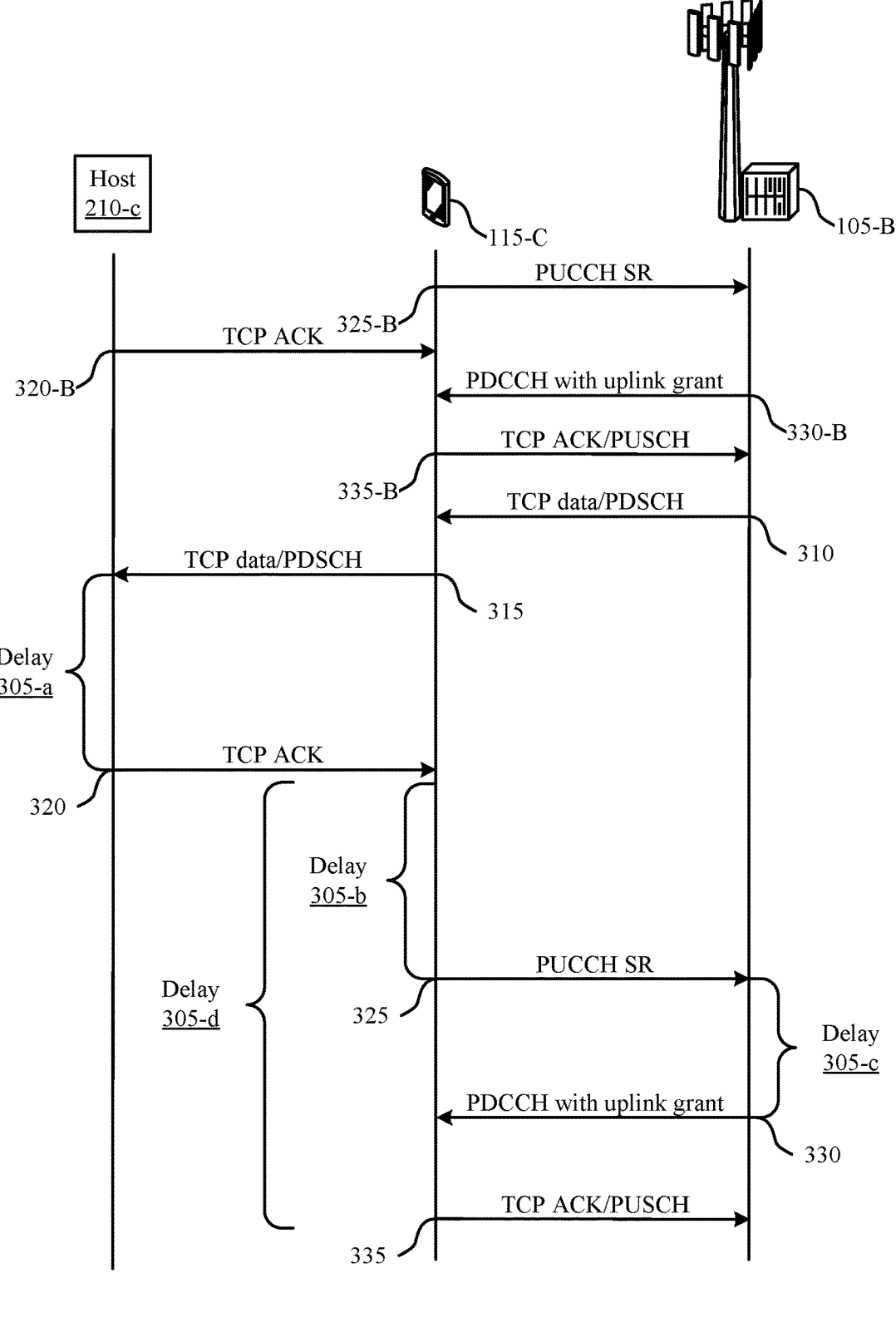
FIG. 3 illustrates an example of a process flow that supports delayed grant for wireless communication in accordance with aspects of the present disclosure.

FIG. 3 illustrates an example of a process flow 300 that supports delayed grant for wireless communication in accordance with aspects of the present disclosure. In some examples, process flow 300 may implement aspects of wireless communication systems 100 and 200. UE 115-*c* may communicate with host 210-*c*. host 210-*c* may be included within UE 115-*c* or may be an external component. UE 115-*c* may also communicate with base station 105-*b*. Base station 105-*b* may be an example of base station 105 as described with respect to FIG. 1 or 2. UE 115-*c* may be an example of a UE 115 as described with respect to FIG. 1 or 2. Host 210-*c* may be an example of host 210-*a* or 210-*b* as described with respect to FIG. 2. Process flow 300 may represent a general communication flow between base station 105-*b*, UE 115-*c*, and host 210-*c*, and may be an example of transmissions by UE 115-*c* without predictive SR.

At 310, base station 105-*b* may transmit data to UE 115-*c* via its modem. For example, base station 105-*b* may transmit TCP data in a PDSCH to UE 115-*c*. A modem of UE 115-*c* may then transmit the data (e.g., the TCP data/PDSCH information) to host 210-*c*. Host 210-*c* may process the data received from UE 115-*c*, which may result in first delay 305-*a*.

After processing, host 210-*c* may transmit an ACK, such as a TCP ACK, to a modem of UE 115-*c*, indicating that host 210-*c* successfully received and decoded that data received from UE 115-*c*. In some cases, host 210-*c* may transmit a NACK indicating that the data was not successfully received or decoded. In some cases, the modem may receive the uplink data from host 210-*c* after uplink resources scheduled by a prior uplink grant have passed.

Based on receiving the ACK from host 210-*c*, UE 115-*c* may transmit a SR to base station 105-*b*. The SR may indicate that UE 115-*c* has data in an uplink transmission buffer available for transmission. UE 115-*c* may wait until a next SR occasion occurs to transmit a SR, which may lead to a second delay 305-*b*. Once the SR occasion occurs, UE 115-*c* may transmit a SR within the SR occasion to base station 105-*b* in a PUCCH after delay 305-*b*. Base station 105-*b* may receive the SR, process the SR, and then transmit a grant in response, each of which may incur a third delay 305-*c*.

After third delay 305-*c*, at 330 base station 105-*b* may transmit an uplink grant to UE 115-*c* in a PDCCH. The uplink grant may indicate resources designated for UE 115-*c* to use to transmit the ACK from host 210-*c* or other uplink data. At 335, UE 115-*c* may utilize the resources indicated in the uplink grant to transmit TCP ACK in PUSCH resources.

Thus, there may be a delay 305-*d* from when UE 115-*c* receives the TCP ACK from host 210-*c* at 320 and when UE 115-*c* transmits the TCP ACK at 335. In accordance with the techniques described herein, this delay may be reduced by strategically transmitting delay grant requests to indicate a future time at which an uplink grant is desired prior to the UE 115-*c* receiving the TCP ACK from host 210-*c* for uplink transmission. The UE 115-*c* may predict when future data is likely to be received from host 210-*c* for uplink transmission to base station 105-*b* to determine the future time at which the uplink grant is requested. Further, in some cases, UE 115-*c* may transmit PUCCH SR 325-*b* to base station 105-*a* before receiving the ACK data at 320-*b*. UE 115-*c* may receive the ACK data from host 210-*c* and may also receive an uplink grant from base station 105-*b* at 330-*b*. The transmission of the PUCCH SR 325-*b* may allow UE 115-*c* to transmit ACK data 320-*b* in the resources granted in uplink grant 330-*b* in cases where the TCP ACK 320-*b* is received from host 210-*a* at particular times and in windows that line up with other scheduled uplink communications. For example, the modem of UE 115-*c* may receive the TCP ACK data 320-*b* after transmission of the PUCCH SR at 325-*b*. The UE 115-*c* may use the resources allocated by the uplink grant 330-*b* to also send the TCP ACK data 320-*b*. Hence, the UE 115-*c* may piggyback transmission of the TCP ACK data 320-*b* on resources scheduled for other transmissions due to the TCP ACK data 320-*b* being available in a transmission buffer when the scheduled resources occur. UE 115-*c* may then transmit the TCP ACK/PUSCH at 335-*b*. However, such piggybacking scenarios are infrequent and conventional SR signaling techniques result in latency in which a UE 115-*c* waits for transmission of TCP ACK data 320-*b* that is stored in a transmission buffer and available for transmission. To resolve such latency issues, future data prediction and delayed grant requests as described herein may be used by UE 115-*c* to efficiently utilize resources and reliably transmit data from host 210-*c* to base station 105-*b* according to latency requirements and other system requirements.

Figure 4:
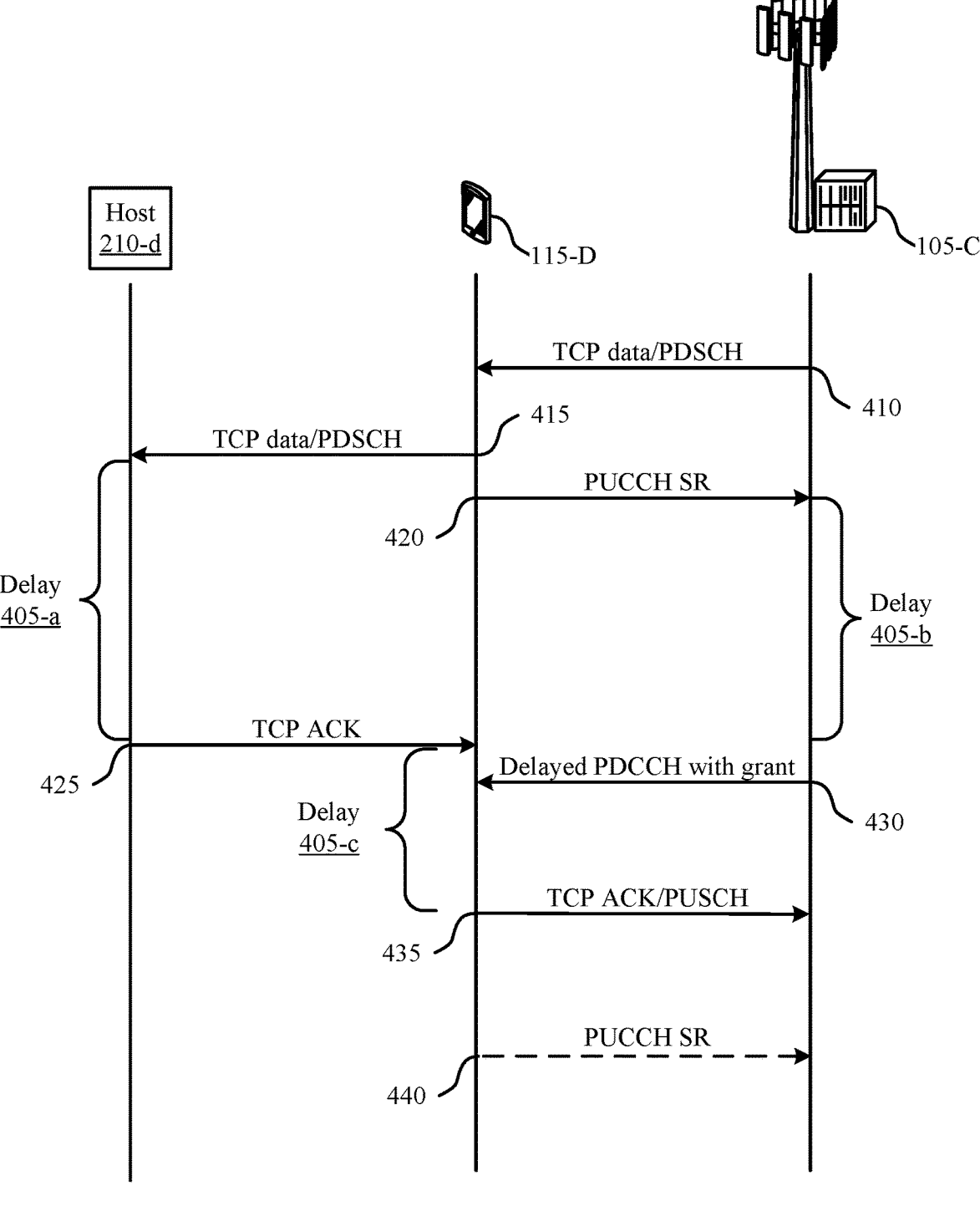
FIG. 4 illustrates an example of a process flow that supports delayed grant for wireless communication in accordance with aspects of the present disclosure.

FIG. 4 illustrates an example of a process flow 400 that supports delayed grant for wireless communication in accordance with aspects of the present disclosure. In some examples, process flow 400 may implement aspects of wireless communication systems 100 and 200. UE 115-*d* may communicate with host 210-*d*. Host 210-*d* may be included within UE 115-*d* or may be an external component. UE 115-*d* may also communicate with base station 105-*c*. Base station 105-*c* may be an example of base station 105 as described with respect to FIG. 1, 2, or 3. UE 115-*d* may be an example of a UE 115 as described with respect to FIG. 1, 2, or 3. Host 210-*d* may be an example of host 210-*a*, 210-*b*, or 210-*c* as described with respect to FIGS. 2 and 3. Process flow 400 may illustrate an example of predictive SR including UE 115-*d* transmitting a SR with a requested delay.

As described with respect to process flow 300, UE 115-*c* may receive TCP data (or other data traffic) in a PDSCH from base station 105-*c* at 410. At 415, UE 115-*d* may transmit the TCP data and other PDSCH data to host 210-*d*. Host 210-*d* may process the data, leading to processing delay 405-*a*. However, UE 115-*d* may also transmit PUCCH SR at 420 to base station 105-*c*. The SR may be transmitted based on prior predictions of when UE 115-*d* may receive uplink data from host 210-*d* in a causal response to 415. The SR may be used to request an uplink grant for data that UE 115-*d* expects to receive, but that has not yet arrived from host 210-*c*. The SR transmitted at 420 may include an indication of a future time at which an uplink grant is requested. In some cases, UE 115-*d* may transmit the SR based on a signature selected by UE 115-*d*. The signature selected may be based on the expected time that UE 115-*d* expects to receive uplink data from host 210-*d*. In these cases, the signature may indicate to base station 105-*c* the time that UE 115-*d* requests the grant for.

UE 115-*c* may transmit the PUCCH SR at 420, including a grant delay request. The PUCCH SR may be transmitted during a configured SR occasion. The PUCCH SR may include an indication of future time which may be based on the end of delay 405-*b*. The PUCCH SR may be an example of a grant delay request that indicates a future time for base station 105-*c* to provide an uplink grant to UE 115-*d*. The grant delay request may indicate a requested resource allocation size, where the uplink grant may indicate a resource allocation size that is selected based on the requested resource allocation size. Base station 105-*c* may receive the SR, and may delay the transmission of the grant until after the delay 405-*b* has passed based on the future time indicated in the SR. Base station 105-*c* may then transmit the delayed PDCCH with the uplink grant at 430. UE 115-*d* may receive the uplink grant from base station 105-*c*, and the uplink grant may allocate uplink resource for uplink data transmission by UE 115-*d* at the time indicated in the grant delay request transmitted by UE 115-*d* at 420.

The UE 115-*d* may receive the PDCCH indicating an uplink grant for UE 115-*d* to transmit the uplink data (e.g., a TCP ACK). The resources indicated in the uplink grant may correspond to a time closer to when the UE 115-*d* predicts it will receive the TCP ACK (or other uplink data) at 425 from host 210-*d*. In some cases, the grant at 420 may be received prior to, as the same time as, or after, receipt of the uplink data at 425 for uplink transmission. UE 115-*d* may receive the TCP ACK at 425 and receive the PDCCH with the uplink grant at 430. In some examples, the grant may include an indication of a delayed resource allocation and the base station 105-*c* may transmit the grant on the same or adjacent PDCCH slot as the transmitted PUCCH SR. In some examples, the base station 105-*c* may delay transmission of the grant until closer to the indicated future time (e.g., transmit the grant closer to the future time in a PDCCH adjacent to a PUSCH in a same slot, subframe, or superframe, corresponding to the future time, in which the UE 115-*d* is allocated PUSCH resources by the grant in the PDCCH). UE 115-*d* may transmit, to base station 105-*c*, an uplink transmission including the uplink data based on the resources indicated in uplink grant. For example, UE 115-*d* may transmit the TCP ACK in the PUSCH at 435 after receiving uplink grant at 430. UE 115-*d* may therefore not have to wait until after receiving TCP ACK at 425 to transmit the SR to base station 105-*c*. In this case, UE 115-*c* would also not need to wait until the PUCCH SR resource at 440 to transmit the SR to base station 105-*c*, which may result in a longer delay and increased latency.

Using the techniques described herein, a delay 405-*c* between when UE 115-*c* receives the TCP ACK at 425 and when UE 115-*c* transmits the TCP ACK at 435 to base station 105-*c* is much shorter than delay 305-*d* as shown and discussed in reference to process flow 300 without predictive SR transmissions. The transmission of the PUCCH SR at 420 without first storing data in a buffer may therefore decrease latency and improve reliability for communications between base station 105-*c*, UE 115-*d*, and host 210-*d*, for different communication applications.

Figure 5:
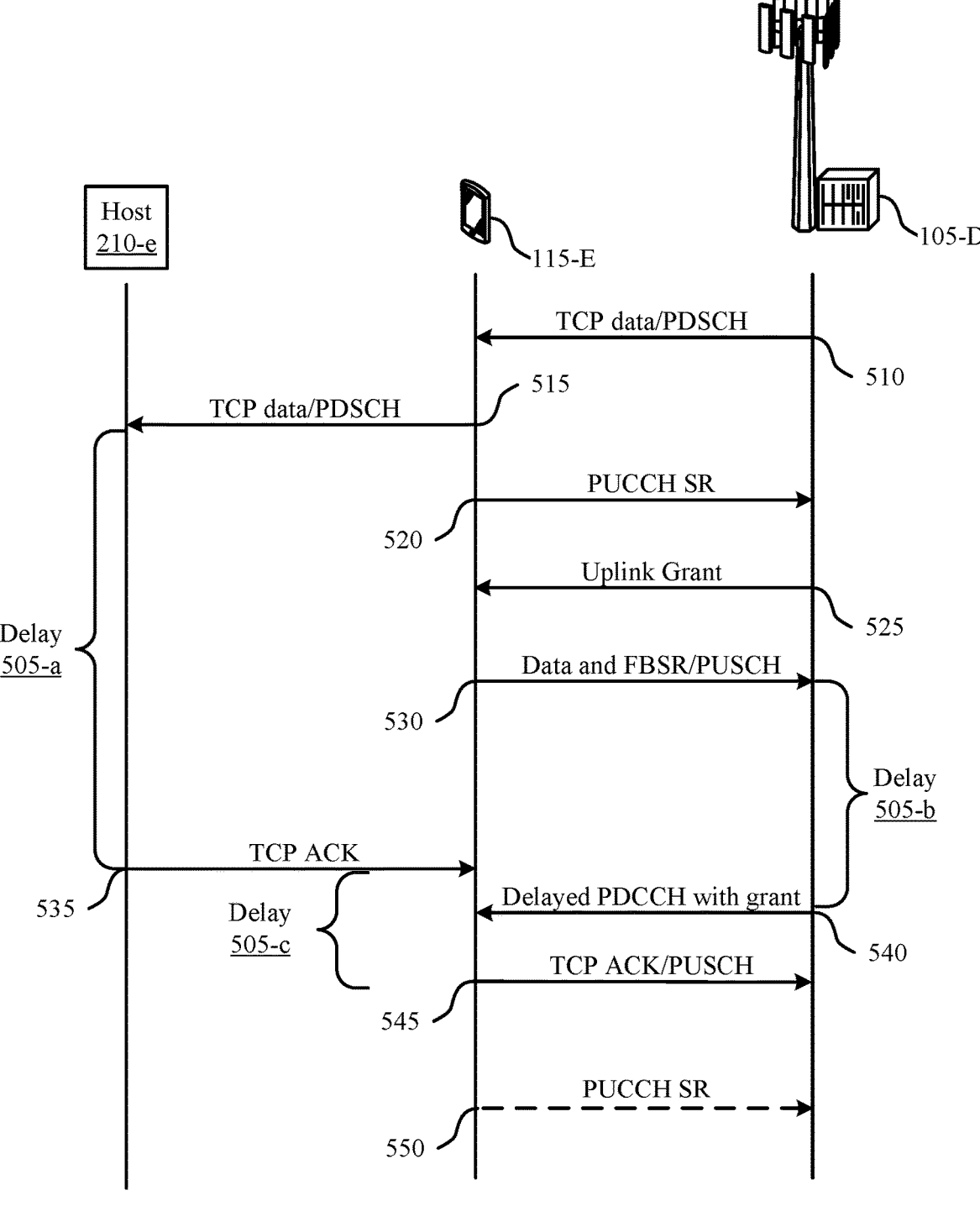
FIG. 5 illustrates an example of a process flow that supports delayed grant for wireless communication in accordance with aspects of the present disclosure.

FIG. 5 illustrates an example of a process flow 500 that supports delayed grant for wireless communication in accordance with aspects of the present disclosure. In some examples, process flow 500 may implement aspects of wireless communication systems 100 and 200. UE 115-*e* may communicate with host 210-*e*. Host 210-*e* may be included within UE 115-*e* or may be an external component. UE 115-*e* may also communicate with base station 105-*d*. Base station 105-*d* may be an example of base station 105 as described with respect to FIG. 1, 2, 3, or 4. UE 115-*e* may be an example of a UE 115 as described with respect to FIG. 1, 2, 3, or 4. Host 210-*e* may be an example of host 210-*a*, 210-*b*, 210-*c*, or 210-*d* as described with respect to FIGS. 2, 3, and 4. Process flow 500 may illustrate an example of indicating a requested delay in a BSR.

As described with respect to process flows 300 and 400, UE 115-*e* may receive TCP data (or other data) from base station 105-*d* at 510. UE 115-*e* may then transmit the TCP data to host 210-*e*. Host 210-*e* may receive the data and may process the data, which may cause delay 505-*a*.

At 520, UE 115-*e* may transmit a PUCCH SR. This first PUCCH SR may request a grant which may be used for the transmission of a FBSR, rather than for the transmission of data received from host 210-*e*. In some cases, resources available for SR transmissions (e.g., bits available SR transmitted at 520) may be limited, such that a particular number of bits may be used by UE 115-*e* to transmit the SR. In some examples, UE 115-*e* may transmit PUCCH SR at 520 requesting a grant in order to send a FBSR. The FBSR may be a part of a MAC BSR that is enhanced to include an indication of future expected buffer status. This expected future status may include UE 115-*e* expecting to receive TCP ACK or other data, such as machine response data, from host 210-*e* at 535 and a future time at which an uplink grant is requested.

At 525, base station 105-*d* may transmit a PDCCH with an uplink grant that allocates resources (e.g., a relatively small resource allocation), which may indicate resources for UE 115-*e* to use for an uplink transmission of the FBSR. At 530, UE 115-*e* may optionally transmit uplink data and may not optionally transmit the FBSR in a PUSCH. The FBSR may include a grant delay request and a report of expected future data volume. The FBSR may include an indication of a future time at which an uplink grant is requested, either implicitly or explicitly. The FBSR may include an indication of the size of the buffer. The size of the buffer may indicate the amount of data stored in the buffer that UE 115-*e* has available for uplink transmission to base station 105-*d*. The size of the buffer may indicate to base station 105-*d* how much uplink data may be transmitted by UE 115-*e*, and thus may indicate a requested amount of resources to be allocated by the uplink grant. The amount of uplink data may be the amount of data that UE 115-*e* expects to receive from host 210-*e* at a later time. In the case of the FBSR grant delay, UE 115-*e* may request a particular future time for with the allocation of an uplink grant, rather than requesting a delay time for the granted uplink resources. Base station 105-*d* may receive the FBSR and the explicit or implicit indication of the grant delay request, and base station 105-*c* may wait for delay 505-*b* before transmitting the delayed PDCCH with the grant at 540 or base station 105-*d* may transmit a PDCCH that delays a grant for a PUSCH. The FBSR may include a requested resource allocation size, where the uplink grant may indicate a resource allocation size that is selected based on the requested resource allocation size. In some cases, the grant 540 may be received prior to, as the same time as, or after, receipt of the uplink data at 535 for uplink transmission.

UE 115-*e* may receive TCP ACK at 535 from host 210-*e*, and may receive the delayed PDCCH with the uplink grant at 540 from base station 105-*d*. UE 115-*c* may then transmit the TCP ACK at 545 to base station 105-*d* using the resources indicated in the grant. Thus, UE 115-*e* may complete the transmission of the TCP ACK to base station 105-*d* before (e.g., well before) the next PUCCH SR occasion at 550. Therefore, UE 115-*e* may receive the TCP ACK at 535 and transmit the TCP ACK at 545 to base station 105-*d* with a delay 505-*c*, rather than waiting for PUCCH SR occasion 550 to request a grant from base station 105-*d* to transmit the TCP ACK. Thus, delay 505-*c* may be less than a typical delay, such as delay 305-*d* as shown in process flow 300.

Figure 6:
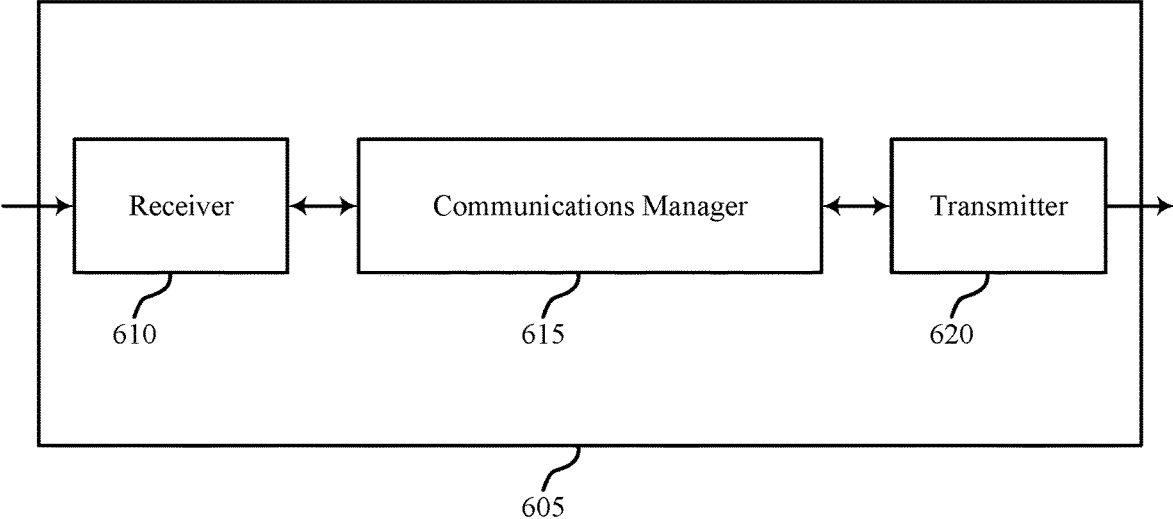
FIGS. 6 and 7 show block diagrams of devices that support delayed grant for wireless communication in accordance with aspects of the present disclosure.

FIG. 6 shows a block diagram 600 of a device 605 that supports delayed grant for wireless communication in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to delayed grant for wireless communication, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may transmit a grant delay request that indicates a future time, at or after which a base station is requested to allocate resources to the UE, receive an uplink grant from the base station allocating the resources to the UE based on the grant delay request, and transmit, to the base station, an uplink transmission including the uplink data based on the uplink grant. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

In some examples, the communications manager 615 described herein may be implemented as a chipset of a wireless modem, and the receiver 610 and the transmitter 620 may be implemented as sets of analog components (e.g., amplifiers, filters, phase shifters, antennas, etc.) The wireless modem may obtain and decode signals from the receiver 610 over a receive interface, and may output signals for transmission to the transmitter 620 over a transmit interface.

The actions performed by the communications manager 615 as described herein may be implemented to realize one or more potential advantages. One implementation may allow a UE 115 to save power and increase battery life by increasing resource usage efficiency and decreasing delay time between transmissions. Communications manager 615 may operate by transmitting grant delay requests, which may decrease length of wait times at a UE 115 and therefore improve efficiency.

Figure 7:
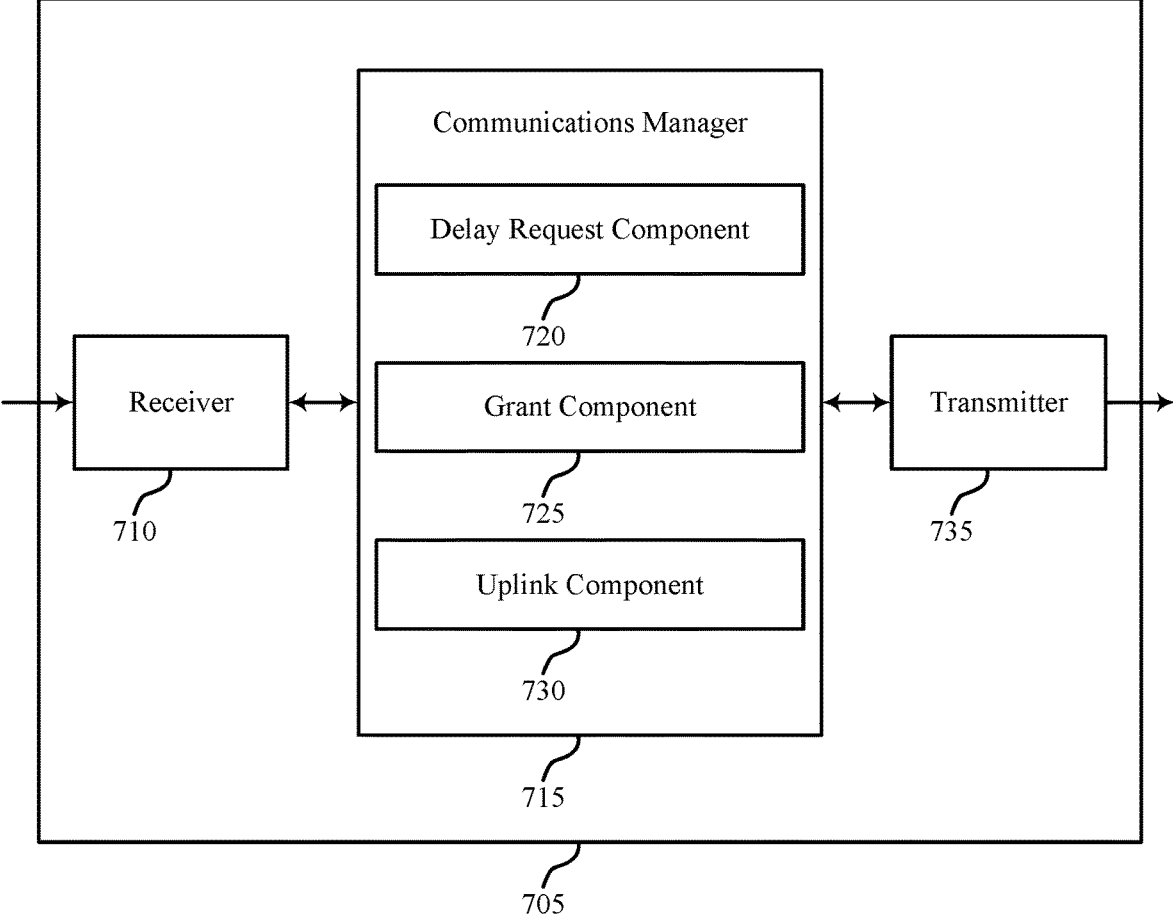

FIG. 7 shows a block diagram 700 of a device 705 that supports delayed grant for wireless communication in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to delayed grant for wireless communication, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a delay request component 720, a grant component 725, and an uplink component 730. The communications manager 715 may be an example of aspects of the communications manager 910 described herein.

The delay request component 720 may transmit a grant delay request that indicates a future time, at or after which a base station is requested to allocate resources to the UE. The grant component 725 may receive an uplink grant from the base station based on the grant delay request. The uplink component 730 may transmit, to the base station, an uplink transmission including the uplink data based on the uplink grant.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

A processor of a UE 115 (e.g., controlling the receiver 710, the transmitter 735, or a transceiver 920) may efficiently transmit a grant delay request, which may be processed by a base station 105. The process of the UE 115 may receive, via receiver 710, an uplink grant from a base station 105. The operations of the processor may improve efficiency of a UE 115 and decrease wait times and times where a UE 115 is not operating productively to communicate with a base station 105 or a host 210. The processor of the UE may also increase the amount of data able to be processed and transmitted by a UE 115 by increasing the frequency of possible data transmissions by the UE 115.

Figure 8:
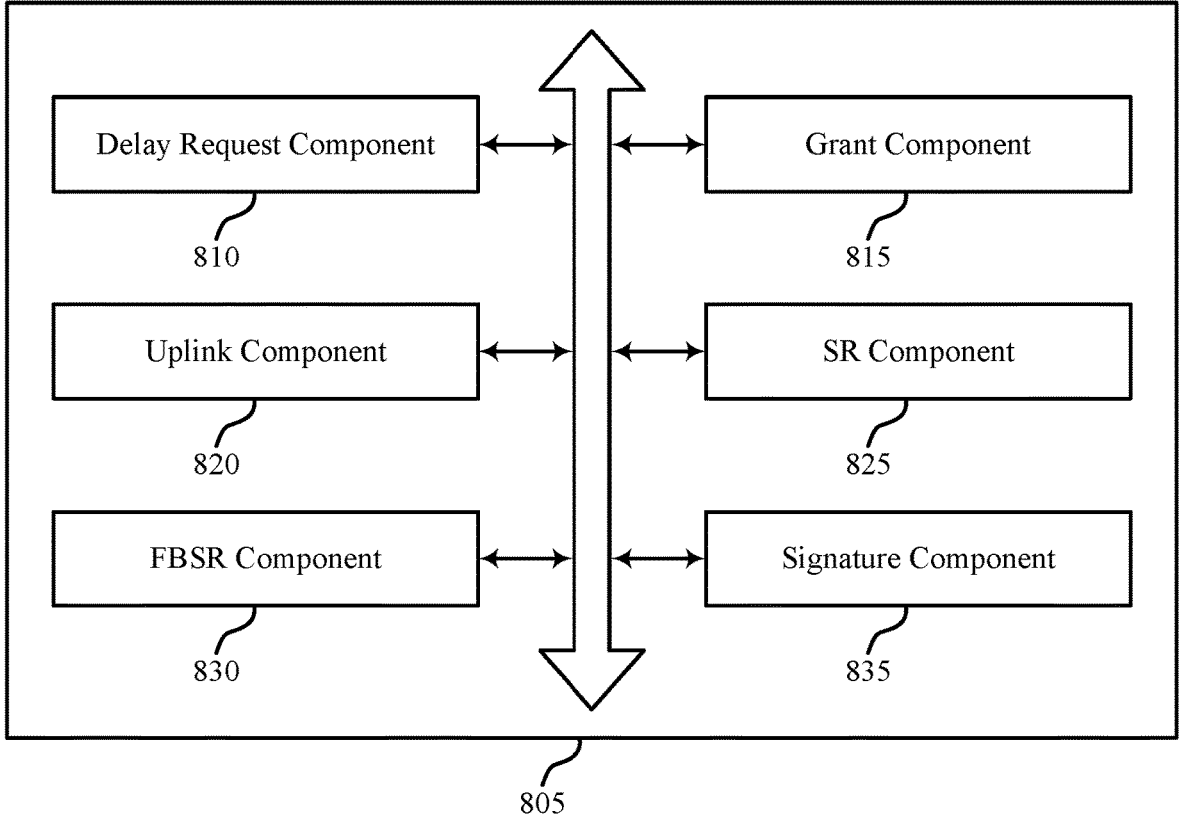
FIG. 8 shows a block diagram of a communications manager that supports delayed grant for wireless communication in accordance with aspects of the present disclosure.

FIG. 8 shows a block diagram 800 of a communications manager 805 that supports delayed grant for wireless communication in accordance with aspects of the present disclosure. The communications manager 805 may be an example of aspects of a communications manager 615, a communications manager 715, or a communications manager 910 described herein. The communications manager 805 may include a delay request component 810, a grant component 815, an uplink component 820, a SR component 825, a FBSR component 830, and a signature component 835. Each of these modules may communicate, directly or indirectly, with one another (e.g., via one or more buses).

The delay request component 810 may transmit a grant delay request that indicates a future time, at or after which a base station is requested to allocate resources to the UE. In some examples, the delay request component 810 may transmit the grant delay request that indicates a requested resource allocation size, where the uplink grant indicates a resource allocation size that is selected based on the requested resource allocation size. In some examples, the delay request component 810 may transmit the grant delay request before the uplink data is available for transmission. In some cases, the future time is indicated using a reference time. In some cases, the reference time may correspond to a superframe number and a subframe number, or a frame number and a slot number.

The grant component 815 may receive an uplink grant from the base station allocating the resources to the UE based on the grant delay request. The uplink component 820 may transmit, to the base station, an uplink transmission including the uplink data based on the uplink grant. In some examples, the uplink component 820 may transmit the uplink transmission in a shared data channel based on the uplink grant. The SR component 825 may transmit a SR that includes the grant delay request. In some examples, the SR component 825 may transmit the SR during a next occurrence of a SR occasion. In some cases, the future time is a defined number of slots after a slot in which the SR is transmitted.

The FBSR component 830 may transmit a buffer status report (BSR) that includes the grant delay request and a report of expected future data. In some examples, transmitting the BSR that includes a requested resource allocation size, where the uplink grant indicates a resource allocation size that is selected based on the requested resource allocation size. In some cases, the future time is a defined number of slots after a slot in which the BSR is transmitted. In some cases, the BSR is a MAC FBSR. In some examples, FBSR component 830 may receive a BSR configuration for requesting a delayed resource allocation, where the BSR is transmitted based on the BSR configuration.

The signature component 835 may transmit the grant delay request that includes a first SR signature from a set of SR signatures, where each of the set of SR signatures corresponds to a different amount of time requested for the base station to delay providing the uplink grant.

In some examples, the signature component 835 may receive a SR signature configuration that indicates the set of SR signatures and a respective grant delay corresponding each of the set of SR signatures. In some examples, the signature component 835 may receive control signaling that indicates the SR signature configuration. In some cases, the first SR signature is selected before the uplink data is available for transmission. In some cases, the control signaling is radio resource control signaling, a MAC control element, or both. In some cases, each of the set of SR signatures is a different bit sequence of a set of bit sequences.

Figure 9:
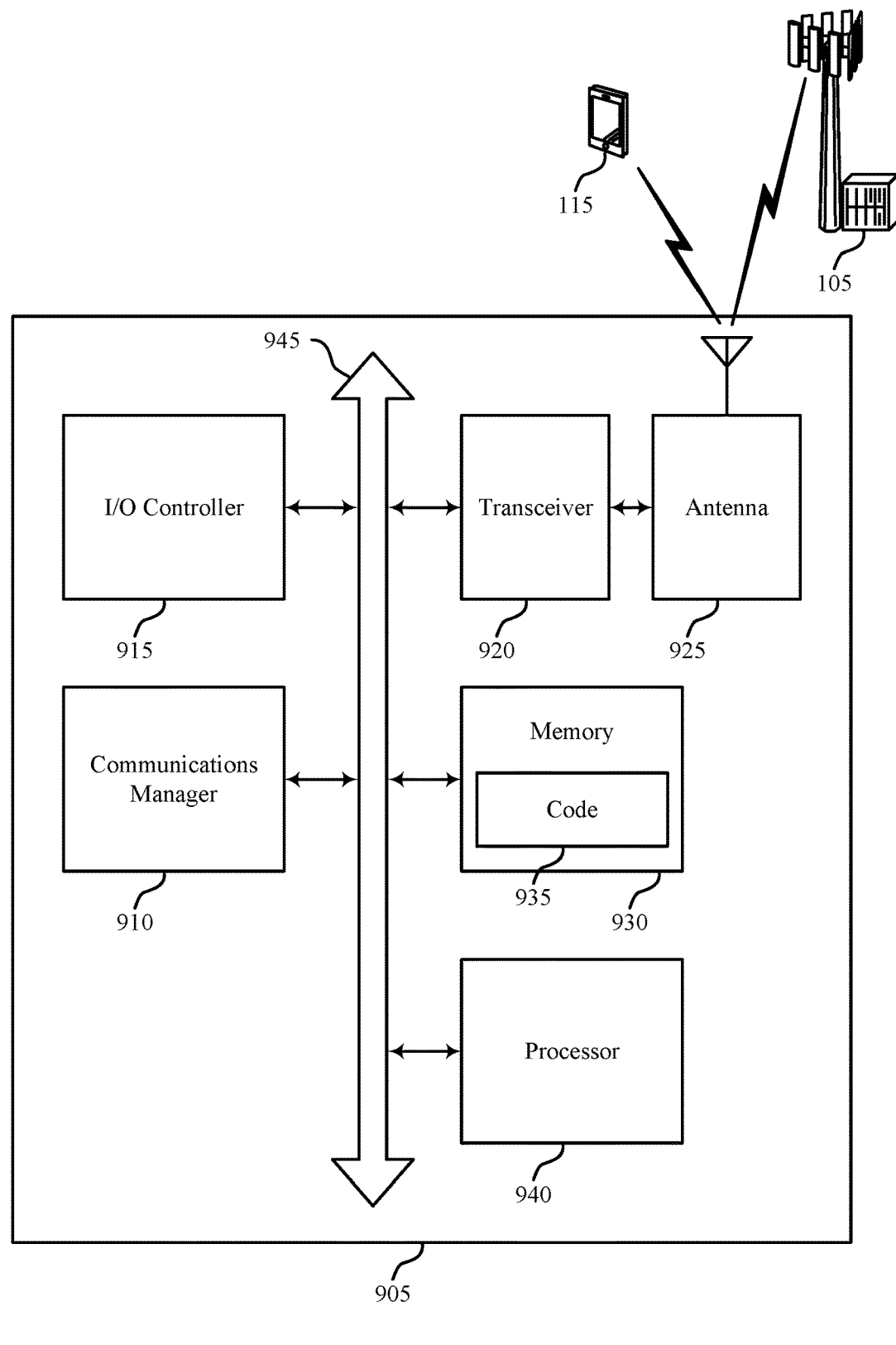
FIG. 9 shows a diagram of a system including a device that supports delayed grant for wireless communication in accordance with aspects of the present disclosure.

FIG. 9 shows a diagram of a system 900 including a device 905 that supports delayed grant for wireless communication in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may transmit a grant delay request that indicates a future time, at or after which a base station is requested to allocate resources to the UE, receive an uplink grant from the base station allocating the resources to the UE based on the grant delay request, and transmit, to the base station, an uplink transmission including the uplink data based on the uplink grant.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touch-screen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting delayed grant for wireless communication).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

FIG. 10 shows a block diagram 1000 of a device 1005 that supports delayed grant for wireless communication in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to delayed grant for wireless communication, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may receive, from a UE, a grant delay request that indicates a future time, at or after which the base station is requested to allocate resources to the UE and transmit an uplink grant to the UE allocating the resources to the UE based on the grant delay request. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
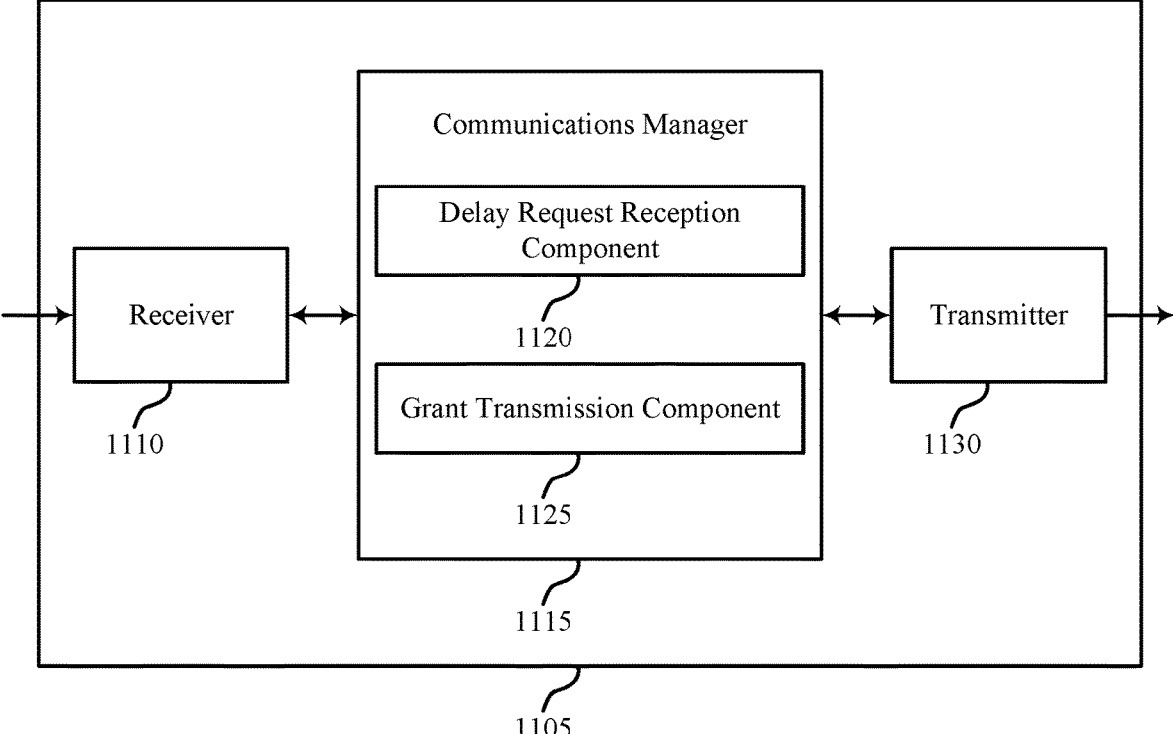

FIG. 11 shows a block diagram 1100 of a device 1105 that supports delayed grant for wireless communication in accordance with aspects of the present disclosure. The device 1105 may be an example of aspects of a device 1005, or a base station 105 as described herein. The device 1105 may include a receiver 1110, a communications manager 1115, and a transmitter 1130. The device 1105 may also include a processor. Each of these components may be in communication with one another (e.g., via one or more buses).

The receiver 1110 may receive information such as packets, user data, or control information associated with various information channels (e.g., control channels, data channels, and information related to delayed grant for wireless communication, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a delay request reception component 1120 and a grant transmission component 1125. The communications manager 1115 may be an example of aspects of the communications manager 1310 described herein.

The delay request reception component 1120 may receive, from a UE, a grant delay request that indicates a future time, at or after which the base station is requested to allocate resources to the UE. The grant transmission component 1125 may transmit an uplink grant to the UE allocating the resources to the UE based on the grant delay request.

The transmitter 1130 may transmit signals generated by other components of the device 1105. In some examples, the transmitter 1130 may be collocated with a receiver 1110 in a transceiver module. For example, the transmitter 1130 may be an example of aspects of the transceiver 1320 described with reference to FIG. 13. The transmitter 1130 may utilize a single antenna or a set of antennas.

Figure 12:
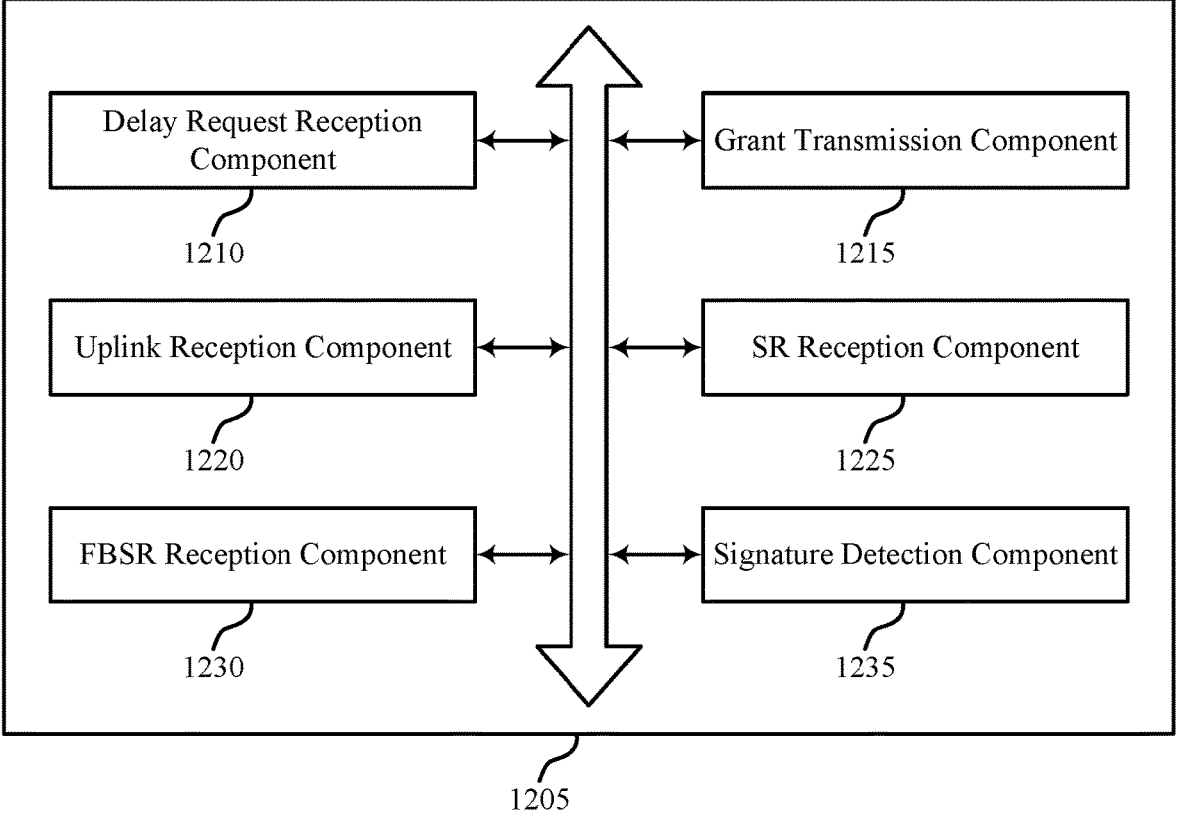
FIG. 12 shows a block diagram of a communications manager that supports delayed grant for wireless communication in accordance with aspects of the present disclosure.

FIG. 12 shows a block diagram 1200 of a communications manager 1205 that supports delayed grant for wireless communication in accordance with aspects of the present disclosure. The communications manager 1205 may be an example of aspects of a communications manager 1015, a communications manager 1115, or a communications manager 1310 described herein. The communications manager 1205 may include a delay request reception component 1210, a grant transmission component 1215, an uplink reception component 1220, a SR reception component 1225, a FBSR reception component 1230, and a signature detection component 1235. Each of these modules may communicate, directly or indirectly, with one another (e.g., via one or more buses).

The delay request reception component 1210 may receive, from a UE, a grant delay request that indicates a future time, at or after which the base station is requested to allocate resources to the UE. In some examples, the uplink grant indicates a grant of resources corresponding to the future time indicated in the grant delay request. In some examples, the delay request reception component 1210 may receive the grant delay request that indicates a requested resource allocation size, where the uplink grant indicates a resource allocation size that is selected based on the requested resource allocation size. In some examples, the delay request reception component 1210 may receive the grant delay request before uplink data is available for transmission. The grant transmission component 1215 may transmit an uplink grant to the UE allocating the resources to the UE based on the grant delay request.

The uplink reception component 1220 may receive, from the UE, an uplink transmission including the uplink data based on the uplink grant. In some examples, the uplink reception component 1220 may receive the uplink transmission in a shared data channel based on the uplink grant. In some cases, the future time is indicated using a reference time, where the reference time may correspond to a superframe number and a subframe number, or a frame number and a slot number. The SR reception component 1225 may receive a SR that includes the grant delay request. In some cases, the future time is a defined number of slots after a slot in which the SR is transmitted The FBSR reception component 1230 may receive a BSR that includes the grant delay request and a report of expected future data. In some examples, receiving the BSR that includes a requested resource allocation size, where the uplink grant indicates a resource allocation size that is selected based on the requested resource allocation size. In some cases, the future time is a defined number of slots after a slot in which the BSR is transmitted. In some cases, the BSR is a MAC future BSR. In some examples, FBSR reception component 1230 may transmit a BSR configuration for requesting a delayed resource allocation, where the BSR is transmitted based on the BSR configuration.

The signature detection component 1235 may receive the grant delay request that includes a first SR signature from a set of SR signatures, where each of the set of SR signatures corresponds to a different amount of time requested for the base station to delay providing the uplink grant.

In some examples, the signature detection component 1235 may transmit a SR signature configuration that indicates the set of SR signatures and a respective delay corresponding each of the set of SR signatures. In some examples, the signature detection component 1235 may receive control signaling that indicates the SR signature configuration. In some cases, the first SR signature is selected before the uplink data is available for transmission. In some cases, the control signaling is radio resource control signaling, a MAC control element, or both. In some cases, each of the set of SR signatures is a different bit sequence of a set of bit sequences.

Figure 13:
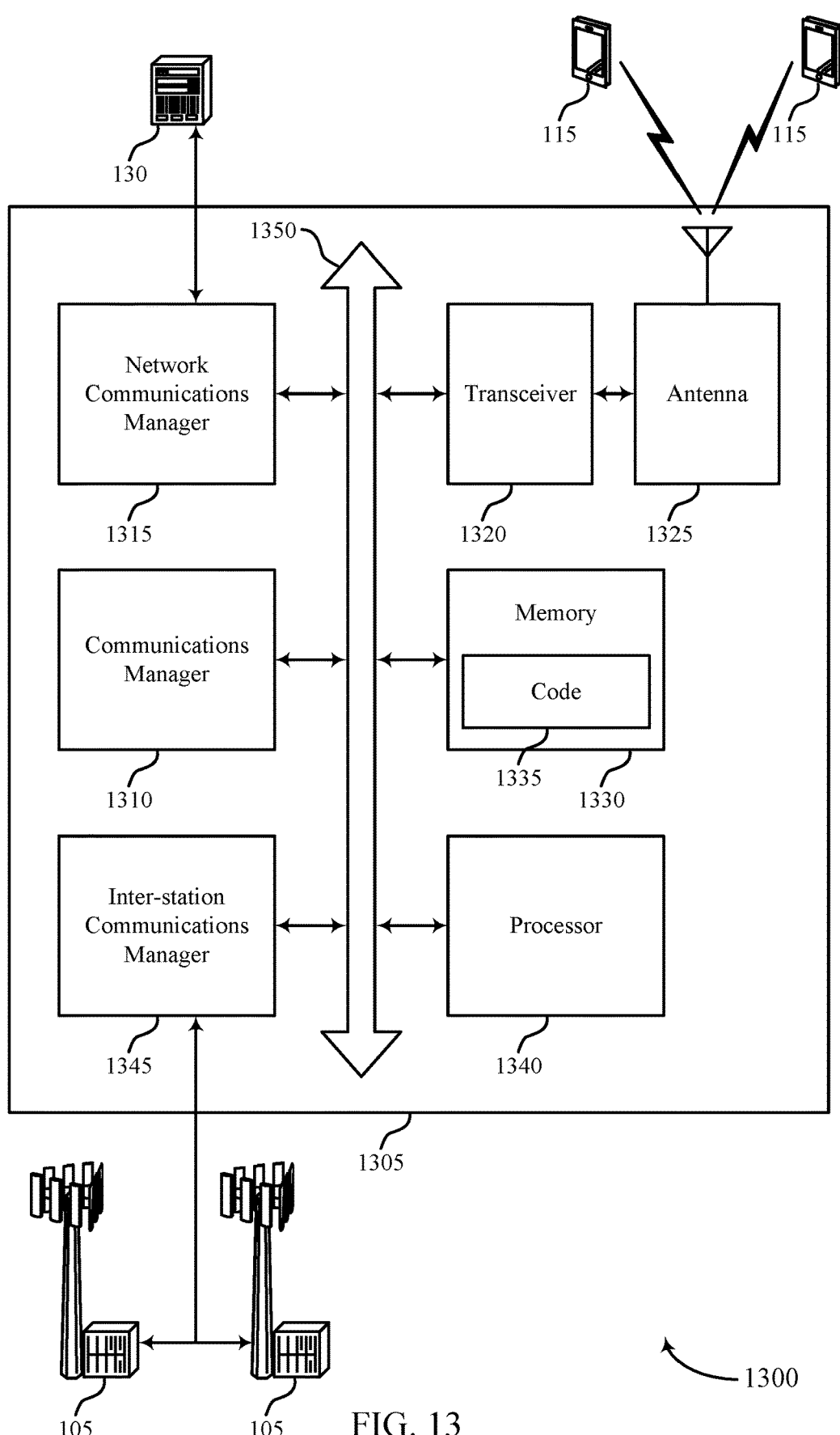
FIG. 13 shows a diagram of a system including a device that supports delayed grant for wireless communication in accordance with aspects of the present disclosure.

FIG. 13 shows a diagram of a system 1300 including a device 1305 that supports delayed grant for wireless communication in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may receive, from a UE, a grant delay request that indicates a future time, at or after which the base station is requested to allocate resources to the UE and transmit an uplink grant to the UE allocating the resources to the UE based on grant delay request. In some examples, the uplink grant indicates a grant of resources corresponding to the future time indicated in the grant delay request.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting delayed grant for wireless communication).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
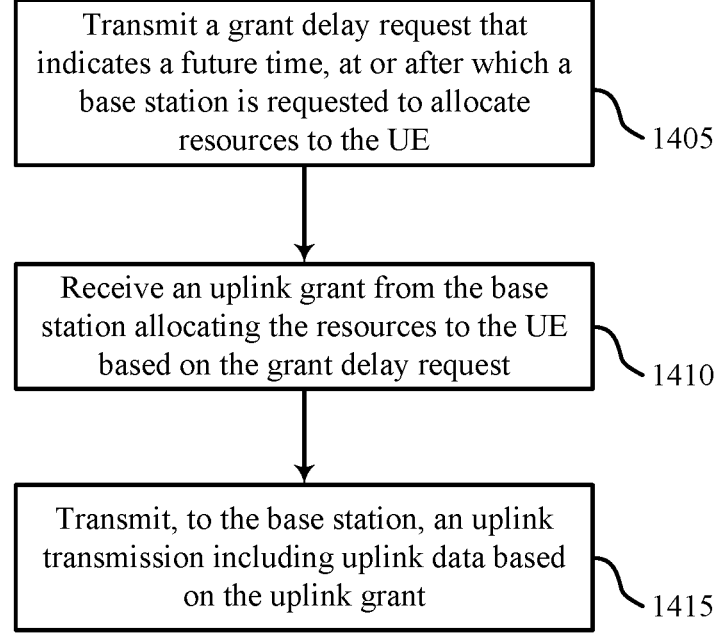

FIG. 14 shows a flowchart illustrating a method 1400 that supports delayed grant for wireless communication in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may transmit a grant delay request that indicates a future time, at or after which a base station is requested to allocate resources to the UE. The operations of 1405 may be performed according to the methods described herein. In some examples, aspects of the operations of 1405 may be performed by a delay request component as described with reference to FIGS. 6 through 9.

At 1410, the UE may receive an uplink grant from the base station allocating the resources to the UE based on the grant delay request. The operations of 1410 may be performed according to the methods described herein. In some examples, aspects of the operations of 1410 may be performed by a grant component as described with reference to FIGS. 6 through 9.

At 1415, the UE may transmit, to the base station, an uplink transmission including uplink data (e.g., an ACK) based on the uplink grant. The operations of 1415 may be performed according to the methods described herein. In some examples, aspects of the operations of 1415 may be performed by an uplink component as described with reference to FIGS. 6 through 9.

FIG. 15 shows a flowchart illustrating a method 1500 that supports delayed grant for wireless communication in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may transmit a grant delay request that indicates a future time, at or after which a base station is requested to allocate resources to the UE. The operations of 1505 may be performed according to the methods described herein. In some examples, aspects of the operations of 1505 may be performed by a delay request component as described with reference to FIGS. 6 through 9.

At 1510, the UE may transmit a SR that includes the grant delay request. The operations of 1510 may be performed according to the methods described herein. In some examples, aspects of the operations of 1510 may be performed by a SR component as described with reference to FIGS. 6 through 9.

At 1515, the UE may receive an uplink grant from the base station allocating the resources to the UE based on the grant delay request. The operations of 1515 may be performed according to the methods described herein. In some examples, aspects of the operations of 1515 may be performed by a grant component as described with reference to FIGS. 6 through 9.

At 1520, the UE may transmit, to the base station, an uplink transmission including uplink data based on the uplink grant. The operations of 1520 may be performed according to the methods described herein. In some examples, aspects of the operations of 1520 may be performed by an uplink component as described with reference to FIGS. 6 through 9.

FIG. 16 shows a flowchart illustrating a method 1600 that supports delayed grant for wireless communication in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may transmit a grant delay request that indicates a future time, at or after which a base station is requested to allocate resources to the UE. The operations of 1605 may be performed according to the methods described herein. In some examples, aspects of the operations of 1605 may be performed by a delay request component as described with reference to FIGS. 6 through 9.

At 1610, the UE may transmit a BSR that includes the grant delay request and a report of expected future data. The operations of 1610 may be performed according to the methods described herein. In some examples, aspects of the operations of 1610 may be performed by a FBSR component as described with reference to FIGS. 6 through 9.

At 1615, the UE may receive an uplink grant from the base station allocating the resources to the UE based on the grant delay request. The operations of 1615 may be performed according to the methods described herein. In some examples, aspects of the operations of 1615 may be performed by a grant component as described with reference to FIGS. 6 through 9.

At 1620, the UE may transmit, to the base station, an uplink transmission including uplink data based on the uplink grant. The operations of 1620 may be performed according to the methods described herein. In some examples, aspects of the operations of 1620 may be performed by an uplink component as described with reference to FIGS. 6 through 9.

Figure 17:
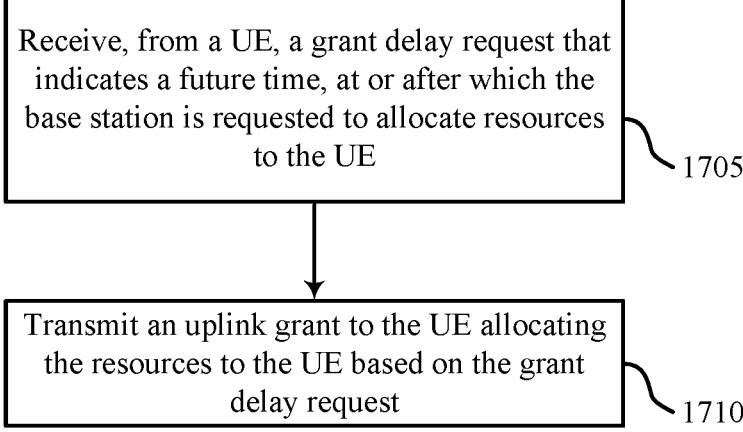

FIG. 17 shows a flowchart illustrating a method 1700 that supports delayed grant for wireless communication in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may receive, from a UE, a grant delay request that indicates a future time, at or after the base station is request to allocate resources to the UE. The operations of 1705 may be performed according to the methods described herein. In some examples, aspects of the operations of 1705 may be performed by a delay request reception component as described with reference to FIGS. 10 through 13.

At 1710, the base station may transmit an uplink grant to the UE based on the grant delay request. The operations of 1710 may be performed according to the methods described herein. In some examples, aspects of the operations of 1710 may be performed by a grant transmission component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A user equipment (UE) for wireless communication, comprising:

one or more memories storing processor-executable code; and one or more processors coupled with the one or more memories, wherein the one or more processors individually or collectively execute the code to cause the UE to:

transmit, to a host device, downlink data;

receive a buffer status report configuration that configures the UE to request a delayed resource allocation via a buffer status report;

transmit, based at least in part on the downlink data and based at least in part on the buffer status report configuration, the buffer status report comprising a grant delay request for the delayed resource allocation, the grant delay request indicating a future time, at or after which a network device is requested to allocate first resources to the UE, wherein the buffer status report further comprises an indication of an expected amount of uplink data in an uplink transmit buffer at or after the future time and before the uplink data arrives at the UE;

receive, based at least in part on the grant delay request indicating the future time, an uplink grant from the network device allocating the first resources that occur at or after the future time to the UE and indicating for the UE to transmit, via the first resources, a feedback message that indicates whether the downlink data is successfully decoded at the host device; and transmit, to the network device via the first resources, an uplink transmission comprising the feedback message based at least in part on the uplink grant.

2. The UE of claim 1, wherein, to transmit the buffer status report, the one or more processors individually or collectively further execute the code to cause the UE to:

transmit the buffer status report that comprises a requested resource allocation size, wherein the uplink grant indicates a resource allocation size that is based at least in part on the requested resource allocation size.

3. The UE of claim 1, wherein the one or more processors individually or collectively further execute the code to cause the UE to:

transmit a scheduling request requesting second resources for transmission of the buffer status report.

4. The UE of claim 3, wherein the one or more processors individually or collectively further execute the code to cause the UE to:

receive a second uplink grant from the network device allocating the second resources to the UE based at least in part on the scheduling request; and transmit the buffer status report using the second resources based at least in part on the second uplink grant.

5. The UE of claim 1, wherein the one or more processors individually or collectively further execute the code to cause the UE to:

monitor a shared data channel for the downlink data from the network device.

6. The UE of claim 1, wherein the feedback message comprises a negative acknowledgement (NACK) or an acknowledgment (ACK).

7. The UE of claim 1, wherein, to transmit the buffer status report, the one or more processors individually or collectively further execute the code to cause the UE to:

transmit the buffer status report before the feedback message is available for transmission.

8. The UE of claim 1, wherein, to transmit the uplink transmission, the one or more processors individually or collectively further execute the code to cause the UE to:

transmit the uplink transmission in a shared data channel based at least in part on the uplink grant.

9. The UE of claim 1, wherein the buffer status report further comprises a report of expected future data.

10. The UE of claim 1, wherein the future time is a defined number of slots after a slot in which the buffer status report is transmitted.

11. The UE of claim 1, wherein the future time is indicated using a reference time.

12. A network device for wireless communication, comprising:

one or more memories storing processor-executable code; and one or more processors coupled with the one or more memories, wherein—the one or more processors individually or collectively execute the code to cause the network device to:

transmit, to a user equipment (UE), downlink data;

transmit a buffer status report configuration that configures the UE to request a delayed resource allocation via a buffer status report;

receive, from the UE and based at least in part on the buffer status report configuration, the buffer status report comprising a grant delay request for the delayed resource allocation, the grant delay request indicating a future time, at or after which the network device is requested to allocate first resources to the UE, wherein the buffer status report further comprises an indication of an expected amount of uplink data in an uplink transmit buffer at or after the future time and before the uplink data arrives at the UE;

transmit, based at least in part on the grant delay request indicating the future time, an uplink grant to the UE allocating the first resources that occur at or after the future time to the UE and indicating for the UE to transmit, via the first resources, a feedback message that indicates whether the downlink data is successfully decoded at a host device; and receive, from the UE via the first resources, an uplink transmission comprising the feedback message based at least in part on the uplink grant.

13. The network device of claim 12, wherein, to receive the buffer status report, the one or more processors individually or collectively further execute the code to cause the network device to:

receive the buffer status report that comprises a requested resource allocation size, wherein the uplink grant indicates a resource allocation size that is based at least in part on the requested resource allocation size.

14. The network device of claim 12, wherein the one or more processors individually or collectively further execute the code to cause the network device to:

receive a scheduling request requesting second resources for transmission of the buffer status report.

15. The network device of claim 14, wherein the one or more processors individually or collectively further execute the code to cause the network device to:

transmit a second uplink grant to the UE allocating the second resources to the UE based at least in part on the scheduling request; and receive the buffer status report using the second resources based at least in part on the second uplink grant.

16. The network device of claim 12, wherein, to transmit the downlink data, the one or more processors individually or collectively further execute the code to cause the network device to:

transmit the downlink data via a shared data channel.

17. The network device of claim 12, wherein the feedback message comprises a negative acknowledgement (NACK) or an acknowledgment (ACK).

18. The network device of claim 12, wherein, to receive the buffer status report, the one or more processors individually or collectively further execute the code to cause the network device to:

receive the buffer status report before the feedback message is available for transmission.

19. The network device of claim 12, wherein, to receive the uplink transmission, the one or more processors individually or collectively further execute the code to cause the UE to:

receive, from the UE and via the first resources, the uplink transmission in a shared data channel based at least in part on the uplink grant.

20. The network device of claim 12, wherein the buffer status report further comprises a report of expected future data.

21. The network device of claim 12, wherein the future time is a defined number of slots after a slot in which the buffer status report is transmitted.

22. The network device of claim 12, wherein the future time is indicated using a reference time.

23. The network device of claim 12, wherein the uplink grant indicates a grant of resources corresponding to the future time indicated in the grant delay request.

24. A method for wireless communication by a user equipment (UE), comprising:

transmitting, to a host device, downlink data;

receiving a buffer status report configuration that configures the UE to request a delayed resource allocation via a buffer status report;

transmitting, based at least in part on the downlink data and based at least in part on the buffer status report configuration, the buffer status report comprising a grant delay request for the delayed resource allocation, the grant delay request indicating a future time, at or after which a network device is requested to allocate resources to the UE, wherein the buffer status report further comprises an indication of an expected amount of uplink data in an uplink transmit buffer at or after the future time and before the uplink data arrives at the UE;

receiving, based at least in part on the grant delay request indicating the future time, an uplink grant from the network device allocating first resources that occur at or after the future time to the UE and indicating for the UE to transmit, via the first resources, a feedback message that indicates whether the downlink data is successfully decoded at the host device; and transmitting, to the network device via the first resources, an uplink transmission comprising the feedback message based at least in part on the uplink grant.

25. The method of claim 24, wherein transmitting the buffer status report comprises:

transmitting, by the UE, the buffer status report that comprises a requested resource allocation size, wherein the uplink grant indicates a resource allocation size that is based at least in part on the requested resource allocation size.

26. A method for wireless communication by a network device, comprising:

transmitting, by the network device and to a user equipment (UE), downlink data;

transmitting a buffer status report configuration that configures the UE to request a delayed resource allocation via a buffer status report;

receiving, from the UE and based at least in part on the buffer status report configuration, the buffer status report comprising a grant delay request for the delayed resource allocation, the grant delay request indicating a future time, at or after which the network device is requested to allocate resources to the UE, wherein the buffer status report further comprises an indication of an expected amount of uplink data in an uplink transmit buffer at or after the future time and before the uplink data arrives at the UE;

transmitting, based at least in part on the grant delay request indicating the future time, an uplink grant to the UE allocating first resources that occur at or after the future time to the UE and indicating for the UE to transmit, via the first resources, a feedback message that indicates whether the downlink data is successfully decoded at a host device; and receiving, from the UE via the first resources, an uplink transmission comprising the feedback message based at least in part on the uplink grant.

* * * * *